United States Patent

Tashima et al.

[11] Patent Number: 5,020,327
[45] Date of Patent: Jun. 4, 1991

[54] AIR SUPPLY CONTROL SYSTEMS FOR TURBOCHARGED INTERNAL COMBUSTION ENGINES

[75] Inventors: Seiji Tashima; Haruo Okimoto; Toshimichi Akagi, all of Hiroshima, Japan

[73] Assignee: Mazda Motor Corporation, Hiroshima, Japan

[21] Appl. No.: 324,662

[22] Filed: Mar. 17, 1989

[30] Foreign Application Priority Data

Mar. 19, 1988 [JP] Japan .................. 63-66791

[51] Int. Cl.$^5$ .............................................. F02B 37/12
[52] U.S. Cl. ........................................ 60/600; 60/612
[58] Field of Search ........................ 60/600, 603, 612

[56] References Cited

U.S. PATENT DOCUMENTS

| 4,418,536 | 12/1983 | Deutschmann | 60/612 X |
| 4,557,111 | 12/1985 | Haussmann et al. | 60/612 X |
| 4,709,552 | 12/1987 | Rutschmann et al. | 60/612 X |
| 4,781,027 | 11/1988 | Richter et al. | 60/612 X |

FOREIGN PATENT DOCUMENTS

| 41417 | 4/1981 | Japan . | |
| 41418 | 4/1981 | Japan | 60/612 |
| 12177 | 3/1982 | Japan . | |
| 160022 | 9/1984 | Japan . | |
| 169630 | 9/1985 | Japan | 60/612 |
| 178329 | 11/1985 | Japan . | |
| 259722 | 12/1985 | Japan . | |
| 38124 | 2/1986 | Japan . | |
| 275531 | 12/1986 | Japan . | |

Primary Examiner—Michael Koczo
Attorney, Agent, or Firm—Sixbey, Friedman, Leedom & Ferguson

[57] ABSTRACT

An air supply control system for an internal combustion engine includes a plurality of superchargers including a turbosupercharger, an exhaust cutoff valve operative selectively to open and close an exhaust passage in which a turbine of the turbosupercharger is disposed, and an intake air cutoff valve operative selectively to open and close an intake passage in which a blower of the turbosupercharger is disposed, wherein both the exhaust cutoff valve and the intake air cutoff valve are closed when intake air mass flow fed to the engine is to be relatively small and are open when the intake air mass flow is to be relatively large, the intake air cutoff valve is delayed to be open compared with the exhaust cutoff valve when the operating condition of the engine is changed into the situation in which the intake air mass flow is to be relatively large from the situation in which the intake air mass flow is to be relatively small, and the intake air cutoff valve is delayed to be closed compared with the exhaust cutoff valve when the operating condition of the engine is changed into the situation in which the intake air mass flow is to be relatively small from the situation in which the intake air mass flow is to be relatively large.

20 Claims, 7 Drawing Sheets

AIR SUPPLY CONTROL SYSTEMS FOR TURBOCHARGED INTERNAL COMBUSTION ENGINES

BACKGROUND OF THE INVENTION

1. Field of the Invention

The present invention relates generally to air supply control systems for internal combustion engines, and more particularly to a system for controlling air supply effected to an internal combustion engine by a plurality of superchargers accompanying with the internal combustion engine in substantially parallel with each other.

2. Description of the Prior Art

In the field of internal combustion engines used in vehicles, there has been proposed a so-called sequentially controlled supercharging system in which a couple of turbosuperchargers of primary and secondary are employed in an internal combustion engine in substantially parallel with each other and so controlled that only the primary turbosupercharger works for supercharging the engine when intake air mass flow in an intake passage of the engine is relatively small and both the primary and secondary turbosuperchargers work simultaneously for supercharging the engine when the intake air mass flow is relatively large, as disclosed in, for example, the Japanese utility model application published after examination under publication number 57-12177. In such a system, an exhaust cutoff valve is disposed in a portion of an exhaust passage of the engine through which exhaust gas is applied to a turbine of the secondary turbosupercharger and an intake air cutoff valve is also disposed in a portion of the intake passage of the engine through which air compressed by a blower of the secondary turbosupercharger is supplied to a combustion chamber of the engine, and each of the exhaust cutoff valve and the intake cutoff valve is controlled to be close and open so as to cause the primary and secondary turbosuperchargers in the aforementioned manner.

In connection with the control in operation of the primary and secondary turbosuperchargers, if the exhaust cutoff valve and the intake air cutoff valve are opened simultaneously when the engine is accelerated and thereby the operating condition of the engine is shifted into a situation in which the intake air mass flow is relatively large from a situation in which the intake air mass flow is relatively small, it takes a certain period of time after the exhaust and intake air cutoff valves are opened to drive the turbine of the secondary turbosupercharger to rotate at relatively high speed so as to make the supercharging operation of the secondary turbosupercharger effective, and therefore it is feared that air compressed by the primary turbosupercharger flows backward toward the turbosupercharger through the turbine thereof during the certain period of time after the exhaust and the intake air cutoff valves are opened. Accordingly, it has been proposed to cause the exhaust cutoff valve to be opened before the intake air cutoff valve is opened so that the secondary turbosupercharger is subjected to its preliminary rotation before it commences to work for supercharging the engine, for the purpose of avoiding the backward flow of compressed air toward the secondary turbosupercharger, and further to cause a intake air relief valve, which is disposed in an intake air relief passage provided to the intake passage for detouring the blower of the secondary turbosupercharger, to be open during the certain period of time, for the purpose of relieving air so that air surge in the intake passage is prevented from arising.

In the system previously proposed as described above, in the case where the engine is decelerated and thereby the operating condition of the engine is shifted into the situation in which the intake air mass flow is relatively small from the situation in which the intake air mass flow is relatively large, the intake air cutoff valve is closed when the intake air relief valve is opened and then the exhaust cutoff valve is closed with the intention of avoiding air surge arising in the intake passage. However, under such valve operations that the intake air cutoff valve is closed earlier then the exhaust cutoff valve, the blower of the secondary turbosupercharger continues to rotate for the period of time between a time point at which the intake air cutoff valve is closed and a following time point at which the exhaust cutoff valve is closed and further, with the force of inertia, for a certain period of time after the exhaust cutoff valve is closed. This results in that air surge in the intake passage is apt to be caused after the intake air cutoff valve is closed when the engine is decelerated.

OBJECTS AND SUMMARY OF THE INVENTION

Accordingly, it is an object of the present invention to provide an air supply control system for an internal combustion engine provided with a plurality of superchargers including a turbosupercharger operative to work when intake air mass flow fed to the engine is to be relatively large, which avoids the foregoing disadvantages and problems encountered with the prior art.

Another object of the invention is to provide an air supply control system for an internal combustion engine provided with a plurality of superchargers including a turbosupercharger operative to work when intake air mass flow fed to the engine is to be relatively large, which can cause the turbosupercharger to commence supercharging the engine without bringing about backward flow of compressed air toward the secondary turbosupercharger when the engine is accelerated, and cause the turbosupercharger to cease from supercharging without bringing about air surge applied to the engine when the engine is decelerated.

According to the present invention, there is provided an air supply control system for an internal combustion engine comprising a plurality of superchargers including at least a first supercharger and a second supercharger which is constituted as a turbosupercharger having a turbine disposed in one of separated exhaust passages connected with the engine and a blower connected through a shaft with the turbine and disposed in one of separated intake passages connected with the engine, an exhaust cutoff valve operative selectively to be open and closed respectively for opening and closing the separated exhaust passage in which the turbine of the second supercharger is disposed, an intake air cutoff valve operative selectively to be open and closed respectively for opening and closing the separated intake passage in which the blower of the second supercharger is disposed, a first actuator for driving the exhaust cutoff valve to be open and closed selectively, a second actuator for driving the intake air cutoff valve to be open and closed selectively, an engine operation detector for detecting operating conditions of the engine to produce a first detection output, a actuator controller for controlling, in response to the first detection output from the engine operation detector, the first and second actuators to close both the exhaust cutoff valve and the intake air cutoff valve so that the second supercharger is restrained from supercharging the engine when intake air mass flow fed to the engine is to be relatively small and to open both the exhaust cutoff valve and the intake air cutoff valve so that both of the first and second superchargers work simultaneously for supercharging the engine when the intake air mass flow fed to the engine is to be relatively large, an engine operation change detector for detecting, based on the first detection output from the engine operation detector, changes in operating condition of the engine between a situation wherein the intake air mass flow fed to the engine is to be relatively small and a situation wherein the intake air mass flow fed to the engine is to be relatively large and producing a second detection output, and a valve operation setter for controlling, in response to the second detection output from the engine operation change detector, the actuator controller so that the intake air cutoff valve is delayed to be open compared with the exhaust cutoff valve when the operating condition of the engine is changed into the situation wherein the intake air mass flow fed to the engine is to be relatively large from the situation wherein the intake air mass flow fed to the engine is to be relatively small and the intake air cutoff valve is delayed to be closed compared with the exhaust cutoff valve when the operating condition of the engine is changed into the situation wherein the intake air mass flow fed to the engine is to be relatively small from the situation wherein the intake air mass flow fed to the engine is to be relatively large.

In the air supply control system thus constituted in accordance with the present invention, when the second detection output from the engine operation change detector indicates that the engine is accelerated, for example, and the operating condition of the engine is changed into the situation wherein the intake air mass flow fed to the engine is to be relatively large from the situation wherein the intake air mass flow fed to the engine is to be relatively small, the first actuator is controlled by the combination of the actuator controller and the valve operation setter first to open the exhaust cutoff valve and then, after the intake air mass flow fed to the engine has appropriately increased, the second actuator is controlled by the combination of the actuator controller and the valve operation setter first to open the intake air cutoff valve. With the exhaust cutoff valve and the intake air cutoff valve thus controlled, the second supercharger is subjected to its preliminary rotation before the intake air cutoff valve is opened and then commences under the sufficiently high preliminary rotation to work for supercharging the engine when the intake air cutoff valve is opened. Accordingly, backward flow of compressed air toward the second supercharger is prevented from arising when the engine is accelerated.

Further, when the second detection output from the engine operation change detector indicates that the engine is decelerated, for example, and the operating condition of the engine is changed into the situation wherein the intake air mass flow fed to the engine is to be relatively small from the situation wherein the intake air mass flow fed to the engine is to be relatively large, the first actuator is controlled by the combination of the actuator controller and the valve operation setter first to close the exhaust cutoff valve and then, after the intake air mass flow fed to the engine has appropriately reduced or a predetermined period of time has elapsed, the first actuator is controlled by the combination of the actuator controller and the valve operation setter to close the intake air cutoff valve. With the exhaust cutoff valve and the intake air cutoff valve thus controlled, although the turbine of the second supercharger continues to rotate with the force of inertia for a certain period of time after the exhaust cutoff valve his been closed, the intake air cutoff valve is kept open for that period and therefore air surge applied to the engine is prevented from arising when the engine is decelerated.

The above, and other objects, features and advantages of the present invention will become apparent from the following detailed description which is to be read in conjunction with the accompanying drawings.

DESCRIPTION OF THE PREFERRED EMBODIMENTS

Figure 1:
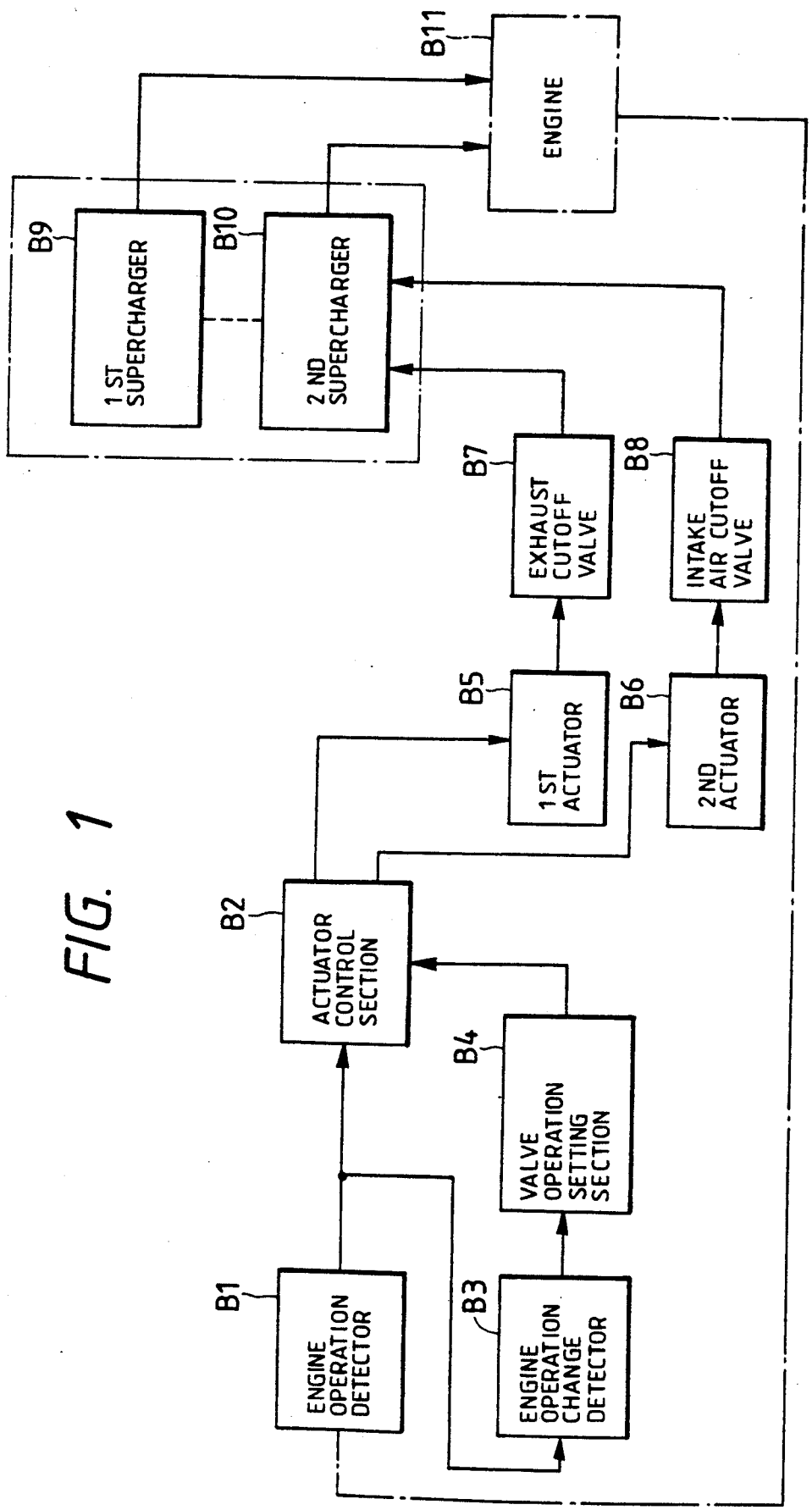
FIG. 1 is a block diagram illustrating the basic arrangement of an air supply control system for an internal combustion engine according to the present invention.

FIG. 1 illustrates a functional block diagram of a system incorporating the present invention. In the functional block diagram of FIG. 1, the system comprises an engine operation detector B1, an actuator control section B2, an engine operation change detector B3, a valve operation setting section B4, a first actuator B5, a second actuator B6, an exhaust cutoff valve B7, an intake air cutoff valve B8, and superchargers including a first supercharger B9 and a second supercharger B10, and the superchargers are connected with an engine B11 to which the system is applied.

The second supercharger B10 is constituted as a turbosupercharger having a turbine disposed in one of exhaust passages of the engine B11 and a blower connected with the turbine and disposed in one of intake passages of the engine B11. The exhaust cutoff valve B7 is operative selectively to be open and closed respectively for opening and closing the exhaust passage in which the turbine of the second supercharger B10 is disposed, and the intake air cutoff valve B8 is operative selectively to be open and closed respectively for opening and closing the intake passage in which the blower of the second supercharger B10 is disposed. The first actuator B5 is operative to drive the exhaust cutoff valve B7 to be open and closed selectively, and the second actuator B6 is operative to drive the intake air cutoff valve B8 to be open and closed selectively.

The engine operation detector B1 detects operating conditions of the engine B11, and the actuator control section B2 is operative to control, in response to a detection output from the engine operation detector B1, the first and second actuators B5 and B6 to close both the exhaust cutoff valve B7 and the intake air cutoff valve B8 so that the second supercharger B10 is restrained from supercharging the engine B11 when the operating condition detected by the engine operation detector B1 indicates that intake air mass flow fed to the engine B11 is to be relatively small, and to open both the exhaust cutoff valve B7 and the intake air cutoff valve B8 so that both of the first and second superchargers B9 and B10 work simultaneously for supercharging the engine B11 when the operating condition detected by the engine operation detector B1 indicates that the intake air mass flow fed to the engine B1 is to be relatively large. The engine operation change detector B3 is operative to detect, based on the detection output from the engine operation detector B1, changes in the operating condition of the engine B11 between a situation wherein the intake air mass flow fed to the engine B11 is to be relatively small and a situation wherein the intake air mass flow fed to the engine B11 is to be relatively large, and the valve operation setting section B4 is operative to control, in response to a detection output from the engine operation change detector B3, the actuator control section B2 so that the intake air cutoff valve B8 is delayed to be open compared with the exhaust cutoff valve B7 when the operating condition of the engine B11 is changed into the situation wherein the intake air mass flow fed to the engine B11 is to be relatively large from the situation wherein the intake air mass flow fed to the engine B11 is to be relatively small and the intake air cutoff valve B8 is delayed to be closed compared with the exhaust cutoff valve B7 when the operating condition of the engine B11 is changed into the situation wherein the intake air mass flow fed to the engine B11 is to be relatively small from the situation wherein the intake air mass flow fed to the engine B11 is to be relatively large.

Figure 2:
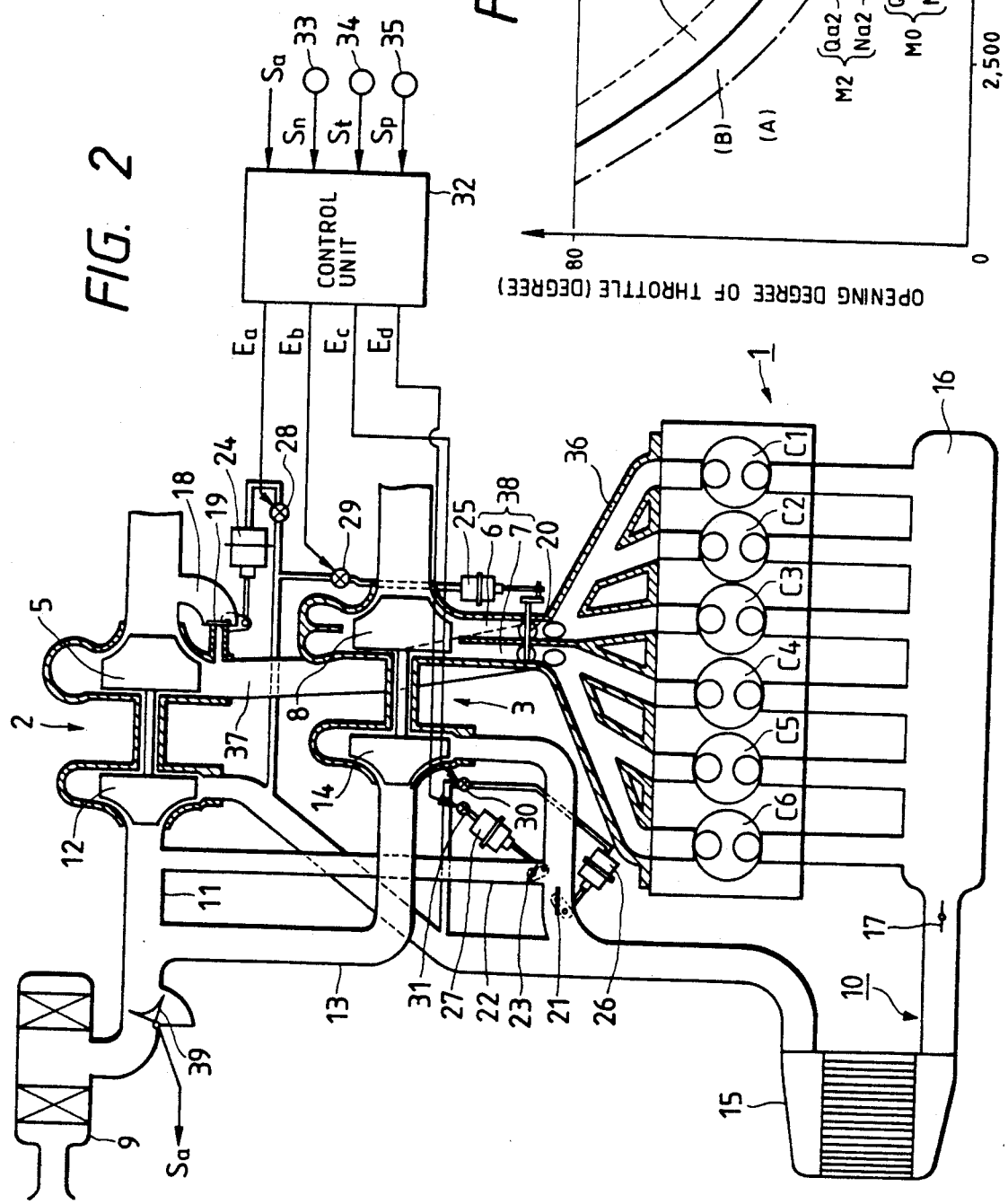
FIG. 2 is a schematic illustration showing an embodiment of air supply control system for an internal combustion engine according to the present invention, together with essential parts of an engine to which the embodiment is applied.

FIG. 2 illustrates an embodiment of air supply control system according to the present invention, together with a part of an engine to which the embodiment is applied.

Referring to FIG. 2, an internal combustion engine 1 is provided with six aligned cylinders C1 to C6, in each of which a combustion chamber is formed. Each of the cylinders C1 to C6 is provided with an inlet port which is controlled to be open and closed by an inlet valve and an exhaust port which is controlled to be open and closed by an exhaustion valve. The six cylinders C1 to C6 take their respective explosion strokes in such a firing order as cylinder C1 → cylinder C4 → cylinder C2 → cylinder C6 → cylinder C3 → cylinder C5, so that the cylinders C1 to C3 constitute a first group of cylinders operative to work with their respective explosion strokes which are not successive to one another and the cylinders C4 to C6 constitute a second group of cylinders operative to work with their respective explosion strokes which are not successive to one another.

An intake passage 10 for supplying the inlet ports of the cylinders C1 to C6 with intake air is provided with a surge chamber 16 to which the inlet ports are connected. The intake passage 10 is further provided with an air cleaner 9, an air flow sensor 39, an intercooler 15 and a throttle valve 17. A portion of the intake passage 10 between the air flow sensor 39 and the intercooler 15 is composed of first and second branched intake passages 11 and 13. The first branched intake passage 11 is provided with a portion formed with a part of a housing of a primary turbosupercharger 2, in which a blower 12 of the primary turbosupercharger 2 is disposed and similarly the second branched intake passage 13 is provided with a portion formed with a part of a housing of a secondary turbosupercharger 3, in which a blower 14 of the secondary turbosupercharger 3 is disposed. A portion of the first branched intake passage 11 positioned to be upstream to the blower 12 and a portion of the second branched intake passage 13 positioned to be downstream to the blower 14 are interconnected through a bypass passage 22 which is provided therein with an intake air relief valve 23. An intake air cutoff valve 21 is disposed in a downstream end portion of the second branched intake passage 13.

An exhaust passage for discharging exhaust gas from the engine 1 is provided with an exhaust manifold 36 forming separated partial exhaust passages connected with the exhaust ports of the cylinders C1 to C6 respectively, a first branched exhaust passage 37 and a second branched exhaust passage 38. The first branched exhaust passage 37 is provided with a portion formed with a part of the housing of the primary turbosupercharger 2 in which a turbine 5 of the primary turbosupercharger 2, which is connected through a rotating shaft with the blower 12, is disposed. The second branched exhaust passage 38 is provided with a pair of guiding passages 6 and 7 and a portion formed with a part of the housing of the secondary turbosupercharger 3 in which a turbine 8 of the secondary turbosupercharger 3, which is connected through a rotating shaft with the blower 14, is disposed. An exhaust cutoff valve 20 is disposed in the second branched exhaust passage 38 for opening and closing selectively both the guiding passages 6 and 7 constituting the second branched exhaust passage 38. This exhaust cutoff valve 20 comprises a butterfly valve, for example. The first branched exhaust passage 37 is further provided with a exhaust relief passage 18 formed to detour the turbine 5 of the primary turbosupercharger 2 and a waste gate valve (WGV) 19 is disposed in the exhaust relief passage 18.

The waste gate valve 19 is linked to a diaphragm actuator 24 which is controlled by a solenoid control valve 28 so as to operate with air pressure supplied thereto from a location downstream to the blower 12 of the primary turbosupercharger 2 in the first branched intake passage 11. The exhaust cutoff valve 20 is linked to a diaphragm actuator 25 which is controlled by a solenoid control valve 29 so as to operate with the air pressure supplied thereto from the location downstream to the blower 12 of the primary turbosupercharger 2 in the first branched intake passage 11. The intake air cutoff valve 21 is linked to a diaphragm actuator 26 which is controlled by a solenoid control valve 30 so as to operate with the air pressure supplied thereto from the location downstream to the blower 12 of the primary turbosupercharger 2 in the first branched intake passage 11. Further, the intake air relief valve 23 is linked to a diaphragm actuator 27 which is controlled by a solenoid control valve 31 so as to operate with the air pressure supplied thereto from the location downstream to the blower 12 of the primary turbosupercharger 2 in the first branched intake passage 11.

The primary turbosupercharger 2 is arranged to be relatively small in supercharging capacity and to have a superior response in supercharging. On the other hand, the secondary turbosupercharger 3 is arranged to be large in supercharging capacity with a response in supercharging inferior to that of the primary turbosupercharger 2.

In the embodiment shown in FIG. 2, a control unit 32 constituted by a microcomputer is also provided for controlling each of the solenoid valves 28, 29, 30 and 31 so as to cause each of the waste gate valve 19, exhaust cutoff valve 20, intake air cutoff valve 21 and intake air relief valve 23 to be open and closed selectively. Detection output signals Sa, Sn, St and Sp obtained from the air flow sensor 39 for detecting intake air mass flow in the intake passage 10, an engine speed sensor 33 for detecting speed of the engine 1 (engine speed), a throttle sensor 34 for detecting opening degree of the throttle valve 17 (opening degree of throttle), and an air pressure sensor 35 for detecting air pressure at a portion downstream to the intake air cutoff valve 21 in the intake passage 10, respectively, are supplied to the control unit 32.

Figure 3:
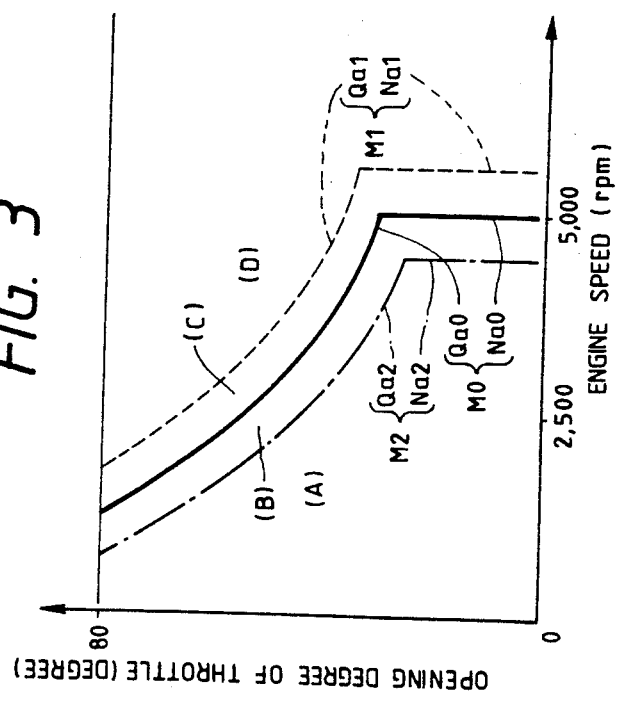
FIG. 3 is a characteristic chart used for explaining the operation of the embodiment shown in FIG. 2.

The control unit 32 is operative to produce control signals Ea, Eb, Ec and Ed selectively based on the detection output signals Sa, Sn, St and Sp and to supply the solenoid control valve 28 with the control signal Ea, the solenoid control valve 29 with the control signal Eb, the solenoid control valve 30 with the control signal Ec, and the solenoid control valve 31 with the control signal Ed, so as to control each of the waste gate valve 19, exhaust cutoff valve 20, intake air cut valve 21 and intake air relief valve 23 in accordance with, for example, a characteristic chart for the operating condition of the engine 1 shown in FIG. 3. The characteristic chart of FIG. 3 shows supercharger operating areas on a coordinate plane defined by an axis of abscissa representing engine speed and an axis of ordinate representing engine load embodied by, for example, opening degree of throttle and stored in the form of data map in a memory contained in the control unit 32. In the characteristic chart shown in FIG. 3, supercharger operating areas (A), (B), (C) and (D) partitioned by a boundary line M2 indicating the operating condition of the engine in which the engine 1 operates with intake air mass flow Qa2 and the operating condition of the engine in which the engine 1 operates at engine speed Na2, a boundary line M0 indicating the operating condition of the engine in which the engine 1 operates with intake air mass flow Qa0 and the operating condition of the engine in which the engine 1 operates at engine speed Na0, and a boundary line M1 indicating the operating condition of the engine in which the engine 1 operates with intake air mass flow Qa1 and the operating condition of the engine in which the engine 1 operates at engine speed Na1.

In the case where the engine 1 is accelerated, when the operating condition of the engine 1 resides in the supercharger operating area (A) or (b) which is set to correspond to the operating condition of the engine 1 in which intake air mass flow fed to the engine 1 is to be relatively small, the control unit 32 is operative to cause each of the exhaust cutoff valve 20 and the intake air cutoff valve 21 to be closed and to cause the intake air relief valve 23 to be open, so that the turbine 8 of the secondary turbosupercharger 3 is not driven to rotate by the exhaust gas discharged from the engine 1 and only the primary turbosupercharger 2 works for supercharging the engine 1. In addition, the control unit 32 is operative further to control the waste gate valve 19 to adjust the air pressure at the position downstream to the blower 12 of the primary turbosupercharger 2 in response to the detection output signal Sp obtained from the air pressure sensor 35. Then, when the operating condition of the engine 1 has moved to cross the line M0 into the supercharger operating area (c), the control unit 32 is operative to open the exhaust cutoff valve 20, and further, when the operating condition of the engine 1 has moved to cross the line M1 into the supercharger operating area (D) which is set to correspond to the operating condition of the engine 1 in which intake air mass flow fed to the engine 1 is to be relatively large, the control unit 32 is operative to close the intake air relief valve 23 and to open the intake air cutoff valve 21, so that the turbine 5 of the primary turbosupercharger 2 and the turbine 8 of the secondary turbosupercharger 3 are driven to rotate by the exhaust gas passing through the first and second branched exhaust passages 37 and 38 respectively and thereby both the primary and secondary turbosuperchargers 2 and 3 are caused to work for supercharging the engine 1.

On the other hand, in the case where the engine 1 is decelerated, when the operating condition of the engine 1 resides in the supercharger operating area (D) or (C), the control unit 32 is operative to cause each of the exhaust cutoff valve 20 and the intake air cutoff valve 21 to be open and to cause the intake air relief valve 23 to be closed, so that both the primary and secondary turbosuperchargers 2 and 3 work for supercharging the engine 1. Then, when the operating condition of the engine 1 has moved to cross the line M0 into the supercharger operating area (B), the control unit 32 is operative to close the exhaust cutoff valve 20 and to open the intake air relief valve 23, and further, when the operating condition of the engine 1 has moved to cross the line M2 into the supercharger operating area (A), the control unit 32 is operative to close the intake air cutoff valve 21, so that the secondary turbosuperchargers 3 are restrained to work for supercharging the engine 1.

As described above, when the engine 1 is accelerated and the operating condition of the engine 1 is changed into the situation wherein the intake air mass flow fed to the engine 1 is to be relatively large from the situation wherein the intake air mass flow fed to the engine 1 is to be relatively small, the exhaust cutoff valve 20 is opened first and then the intake air cutoff valve 21 is opened. Accordingly, the secondary turbosupercharger 3 is subjected to its preliminary rotation before the intake air cutoff valve 21 is opened and commences under the sufficiently high preliminary rotation to work for supercharging the engine 1 when the intake air cutoff valve 21 is opened, so that backward flow of compressed air toward the secondary turbosupercharger 3 in the intake passage 10 is prevented from arising.

Further, when the engine 1 is decelerated and the operating condition of the engine 1 is changed into the situation wherein the intake air mass flow fed to the engine 1 is to be relatively large from the situation wherein the intake air mass flow fed to the engine 1 is to be relatively small, the intake air cutoff valve 21 is kept open until a time point after the exhaust cutoff valve 20 has been closed. Accordingly, although the turbine 8 of the secondary turbosupercharger 3 continues to rotate with the force of inertia for a certain period of time after the exhaust cutoff valve 20 his been closed, air surge in the intake passage 10 is prevented from arising.

Figure 4:
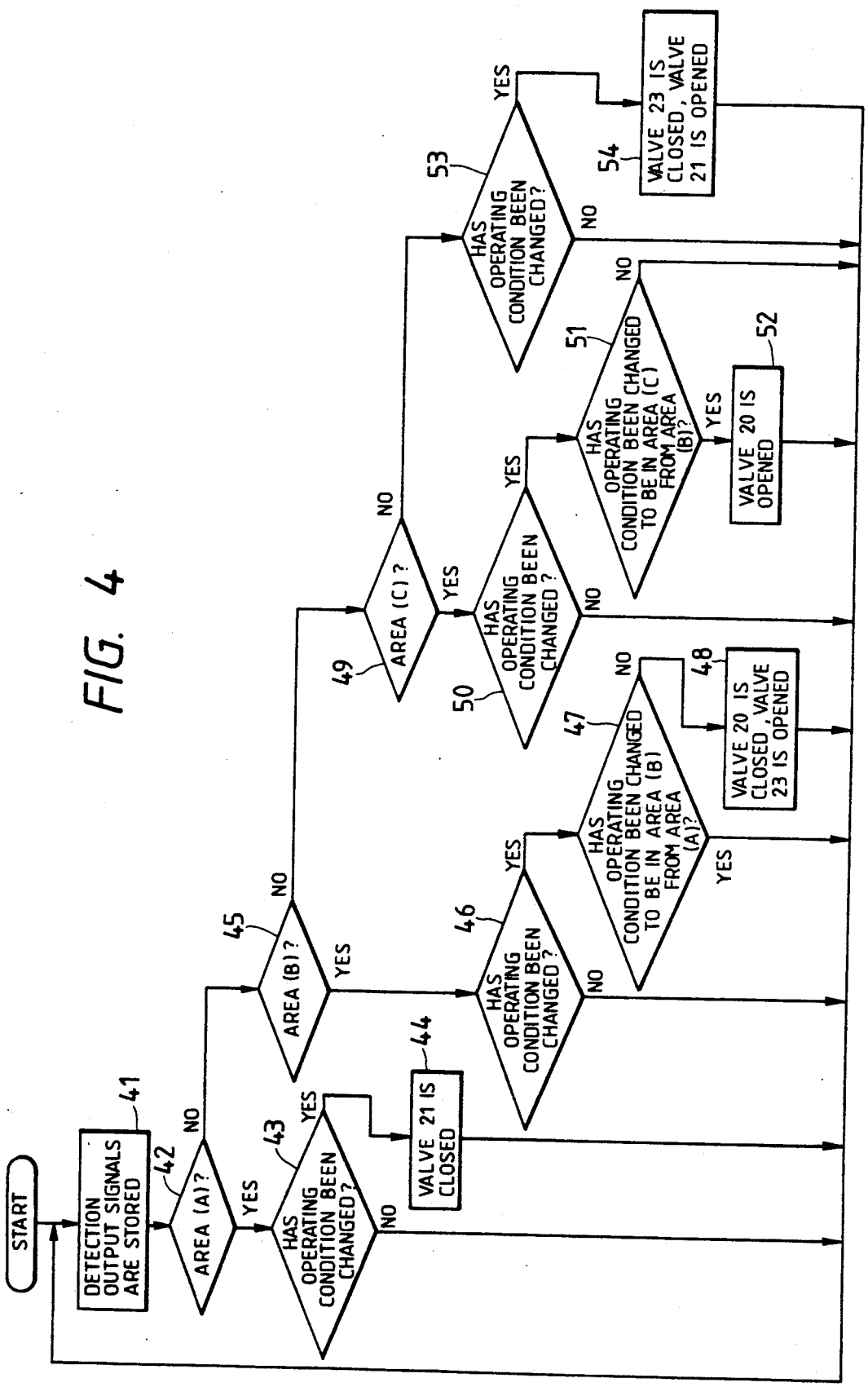
FIG. 4 is a flow chart used for explaining the operation of the embodiment shown in FIG. 2.

One example of an operation program for controlling the exhaust cutoff valve 20, intake air cutoff valve 21 and intake air relief valve 23 as described above is carried out in the control unit 32 in accordance with a flow chart shown in FIG. 4.

According to the flow chart shown in FIG. 4, first, in step 41, the detection output signals Sa, Sn, St and Sp obtained from the sensors 39, 33, 34 and 35, respectively, are stored. Then, in step 42, it is checked whether the operating condition of the engine 1 resides in the supercharger operating area (A) or not, based on the detection output signal Sa representing the intake air mass flow in the intake passage 10 and the detection output signal Sn representing the engine speed. If the operating condition of the engine 1 resides in the supercharger operating area (A), it is checked whether the operating condition of the engine 1 has been changed after the second latest check in the step 42 or not, in step 43.

When it is clarified in the step 43 that the operating condition of the engine 1 has not been changed after the second latest check in the step 42, the process returns to the step 41. To the contrary, if the operating condition of the engine 1 has been changed after the second latest check in the step 42, the control signal Ec is supplied to the solenoid control valve 30 so as to close the intake air cutoff valve 21, in step 44, and then the process returns to the step 41.

If it is clarified in the step 42 that the operating condition of the engine 1 does not reside in the supercharger operating area (A), it is checked whether the operating condition of the engine 1 resides in the supercharger operating area (B) or not based on the detection output signals Sa and Sn, in step 45. If the operating condition of the engine 1 resides in the supercharger operating area (B), it is checked whether the operating condition of the engine 1 has been changed after the second latest check in the step 42 or not, in step 46.

When it is clarified in the step 46 that the operating condition of the engine 1 has not been changed after the second latest check in the step 42, the process returns to the step 41. To the contrary, if the operating condition of the engine 1 has been changed after the second latest check in the step 42, it is further checked whether the operating condition of the engine 1 has been changed to be the supercharger operating area (B) from the supercharger operating area (A) after the second latest check in the step 42 or not, in step 47. As a result of the check in the step 47, it is clarified that the operating condition of the engine 1 has been changed to be the supercharger operating area (B) from the supercharger operating area (A) after the second latest check in the step 42, the process returns to the step 41. To the contrary, if the operating condition of the engine 1 has not been changed to be the supercharger operating area (B) from the supercharger operating area (A) after the second latest check in the step 42, the control signal Eb is supplied to the solenoid control valve 29 so as to close the exhaust cutoff valve 20 and the control signal Ed is supplied to the solenoid control valve 31 so as to open the intake air relief valve 23, in step 48, and then the process returns to the step 41.

If it is clarified in the step 45 that the operating condition of the engine 1 does not reside in the supercharger operating area (B), it is checked whether the operating condition of the engine 1 resides in the supercharger operating area (C) or not based on the detection output signals Sa and Sn, in step 49. If the operating condition of the engine 1 resides in the supercharger operating area (C), it is checked whether the operating condition of the engine 1 has been changed after the second latest check in the step 42 or not, in step 50.

When it is clarified in the step 50 that the operating condition of the engine 1 has not been changed after the second latest check in the step 42, the process returns to the step 41. To the contrary, if the operating condition of the engine 1 has been changed after the second latest check in the step 42, it is further checked whether the operating condition of the engine 1 has been changed to be the supercharger operating area (C) from the supercharger operating area (B) after the second latest check in the step 42 or not, in step 51. As a result of the check in the step 51, it is clarified that the operating condition of the engine 1 has not been changed to be the supercharger operating area (C) from the supercharger operating area (B) after the second latest check in the step 42, the process returns to the step 41. To the contrary, if the operating condition of the engine 1 has been changed to be the supercharger operating area (C) from the supercharger operating area (B) after the second latest check in the step 42, the control signal Eb is supplied to the solenoid control valve 29 so as to open the exhaust cutoff valve 20, in step 52, and then the process returns to the step 41.

Further, if it is clarified in the step 49 that the operating condition of the engine 1 does not reside in the supercharger operating area (C), it is checked whether the operating condition of the engine 1 has been changed after the second latest check in the step 42 or not, in step 53. When it is clarified in the step 53 that the operating condition of the engine 1 has not been changed after the second latest check in the step 42, the process returns to the step 41. To the contrary, if the operating condition of the engine 1 has been changed after the second latest check in the step 42, the control signal Ed is supplied to the solenoid control valve 31 so as to close the intake air relief valve 23 and the control signal Ec is supplied to the solenoid control valve 30 so as to open the intake air cutoff valve 21, in step 54, and then the process returns to the step 41.

Figure 5:
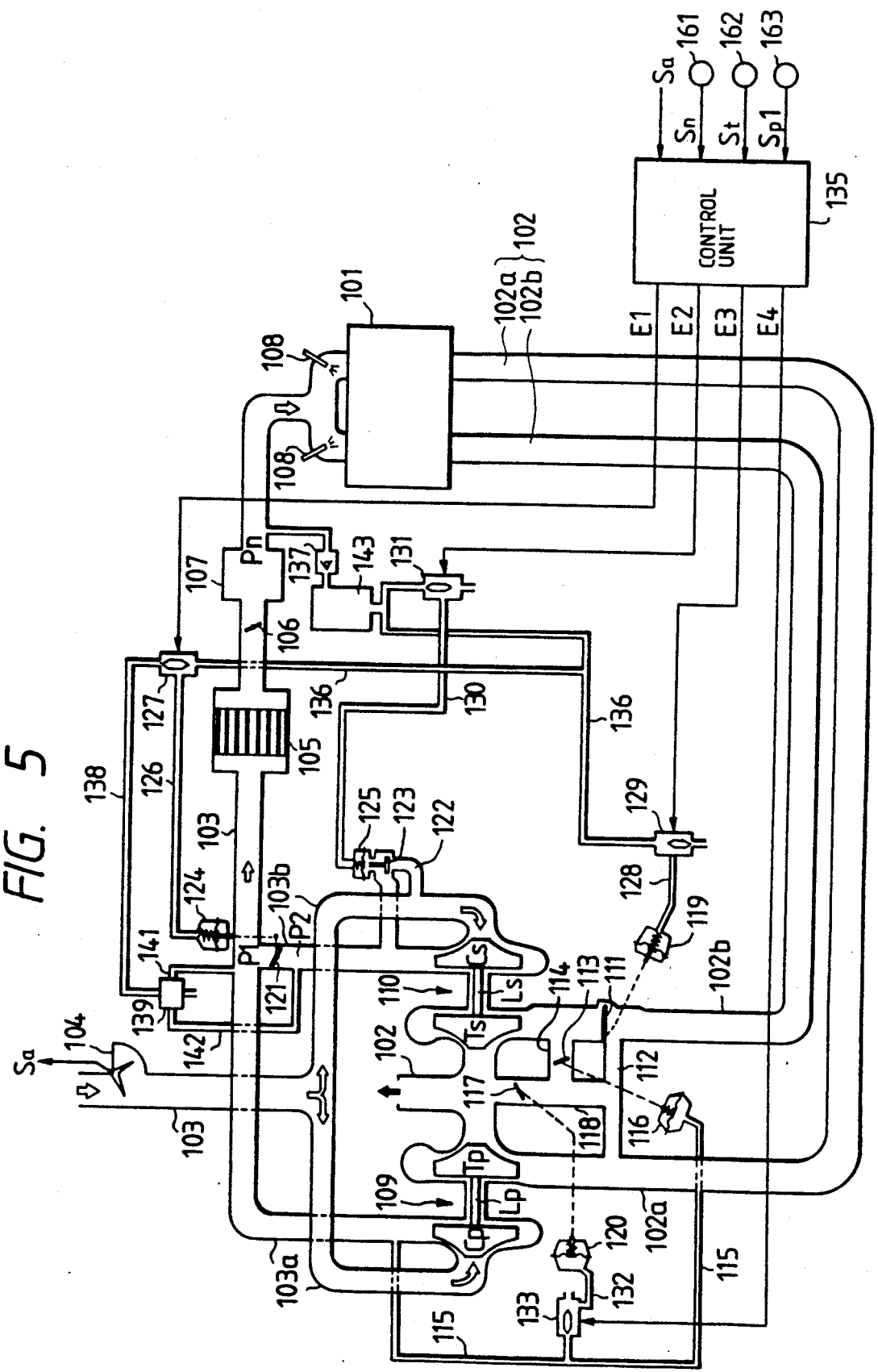
FIG. 5 is a schematic illustration showing another embodiment of air supply control system for an internal combustion engine according to the present invention, together with essential parts of an engine to which the embodiment is applied.

FIG. 5 illustrates another embodiment of air supply control system according to the present invention, together with a part of an engine to which the embodiment is applied.

Referring to FIG. 5, an internal combustion engine 101, which is, for example, a rotary engine having a couple of rotors each forming an operating chamber having the capacity of, for example, 654 cubic centimeters, is provided with an exhaust passage 102 for discharging exhaust gas from the engine 101 and an intake passage 103 for supplying the engine 101 with intake air. The exhaust passage 102 includes first and second separated exhaust passages 102a and 102b, and the intake passage 103 includes first and second branched intake passages 103a and 103b which are separated from each other at a position downstream to an air flow sensor 104 provided for detecting intake air mass flow in the intake passage 103 and merged into each other at a location upstream to an intercooler 105 provided for cooling the intake air in the intake passage 103. A portion of the intake passage 103 downstream to the intercooler 105 is provided with a throttle valve 106, a surge chamber 107 and fuel injectors 108.

A primary turbosupercharger 109 is provided with a turbine Tp disposed in the first separated exhaust passage 102a to be driven to rotate by the exhaust gas and a blower coupled through a rotating shaft Lp with the turbine Tp. A secondary turbosupercharger 110 is also provided with a turbine Ts disposed in the second separated exhaust passage 102b to be driven to rotate by the exhaust gas and a blower Cs disposed in the second branched intake passage 103b and coupled through a rotating shaft Ls with the turbine Ts.

A portion of the first branched intake passage 103a upstream to the blower Cp and a portion of the second branched intake passage 103b upstream to the blower Cs are arranged in a line to form a branched portion, so that pressure waves produced in one of the first and second branched intake passages 103a and 103b are easy to propagate to the other of the first and second branched intake passages 103a and 103b but hard to propagate toward the air flow sensor 104.

An exhaust cutoff valve 111 is disposed in a portion of the second separated exhaust passage 102b upstream to the turbine Ts. This exhaust cutoff valve 111 is operative to close the second separated exhaust passage 102b in order to prevent the exhaust gas from being supplied to the turbine Ts so that only the primary turbosupercharger 109 works in a situation where intake air mass flow supplied to the engine 101 is relatively small.

A portion of the second separated exhaust passage 102b upstream to the exhaust cutoff valve 111 is connected through a connecting passage 112 with a portion of the first separated exhaust passage 102a upstream to the turbine Tp. The connecting passage 112 is also connected with a portion of the exhaust passage 102 downstream to the turbines Tp and Ts through a bypass passage 118 in which a waste gate valve 117 is provided. A portion of the bypass passage 118 upstream to the waste gate valve 117 is connected with a portion of the second separated exhaust passage 102b between the exhaust cutoff valve 111 and the turbine Ts through an exhaust bypass passage 114 in which an exhaust bypass snifting valve 113 is provided.

The exhaust bypass snifting valve 113 is driven by a diaphragm actuator 116 and a pressure chamber of the diaphragm actuator 116 is coupled through a control pressure pipe 115 with a portion of the first branched intake passage 103a downstream to the blower Cp.

An intake air cutoff valve 121 is disposed in a portion of the second branched intake passage 103b downstream to the blower Cs. The second branched intake passage 103b is provided also with an intake air relief passage 122 detouring the turbine Ts and having therein an intake air relief valve 123. The intake air cutoff valve 121 is driven by a diaphragm actuator 124, and the intake air relief valve 123 is driven by a diaphragm actuator 125.

A control pressure pipe 126 extending from the diaphragm actuator 124 for driving the intake air cutoff valve 121 is connected with an output port of a three-way solenoid valve 127, and a control pressure pipe 128 extending from a diaphragm actuator 119 for driving the exhaust cutoff valve 111 is connected with an output port of a three-way solenoid valve 129. Further, a control pressure pipe 130 extending from the diaphragm actuator 125 for driving the intake air relief valve 123 is connected with an output port of a three-way solenoid valve 131, and a control pressure pipe 132 extending from a diaphragm actuator 120 for driving the waste gate valve 117 is connected with an output port of a three-way solenoid valve 133. The three-way solenoid valves 127, 129, 131 and 133 are controlled by a control unit 135 constituted by a microcomputer.

The control unit 135 is provided with detection output signals Sa, Sn, St and Sp1 obtained from the air flow sensor 104, an engine speed sensor 161 for detecting the engine speed, a throttle sensor 162 for detecting opening degree of the throttle valve 106 (opening degree of throttle), and an air pressure sensor 163 for detecting an air pressure P1 at a portion downstream to the blower Cp in the first branched intake passage 103a, respectively, and operative to produce control signals E1 to E4 selectively based on the detection output signals Sa, Sn, St and Sp1 and to supply the three-way solenoid valve 127 with the control signal E1, the three-way solenoid valve 131 with the control signal E2, the three-way solenoid valve 129 with the control signal E3, and the three-way solenoid valve 133 with the control signal E4.

One of input ports of the three-way solenoid valve 129 is open to the atmosphere and the other of the input ports is connected through a pipe 136 with a negative pressure tank 143 to which negative pressure Pn at a portion downstream to the throttle valve 106 in the intake passage 103 is supplied through a check valve 137. One of input ports of the three-way solenoid valve 127 is connected through the pipe 136 with the negative pressure tank 143 and the other of the input ports is connected through a pipe 138 with a pressure difference detecting valve 139.

Figure 6:
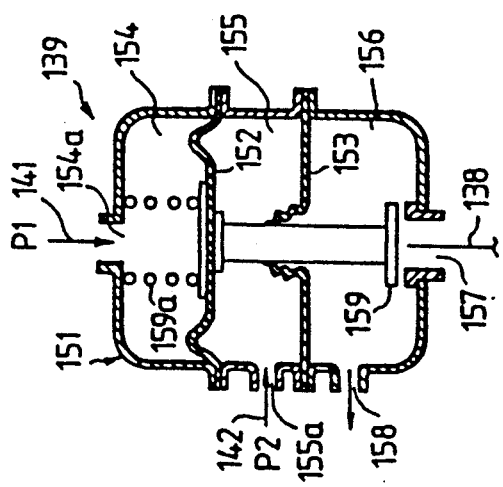
FIG. 6 is a schematic illustration showing a pressure difference detecting valve employed in the embodiment shown in FIG. 5.

As shown in FIG. 6, the pressure difference detecting valve 139 has a housing 151 in which three chambers 154, 155 and 156 are formed with diaphragms 152 and 153. The chambers 154 and 155 are provided with input ports 154a and 155a, respectively, and the chamber 156 is provided with an open port 158 and an output port 157 connected with the pipe 138. The input port 154a is connected through a pipe 141 with the portion of the first branched intake passage 103a downstream to the blower Cp so as to be supplied with the air pressure P1, and the input port 155a is connected through a pipe 142 with a portion of the second branched intake passage 103b upstream to the intake air cutoff valve 121 so as to be supplied with an air pressure P2 at a portion upstream to the intake air cutoff valve 121 in the second branched intake passage 103b.

The pressure difference detecting valve 139 is provided further with a valve body 159 connected with the diaphragms 152 and 153 and biased by a spring 159a disposed in the chamber 154. This valve body 159 is operative to keep the output port 157 open so as to open the chamber 156 to the atmosphere when a pressure difference between the air pressures P1 and P2 is relatively large and keep the output port 157 closed when the pressure difference between the air pressures P1 and P2 is equal to or smaller than a predetermined pressure value $\Delta P$. Accordingly, when the control pressure pipe 126 is communicated with the pipe 138 through the three-way solenoid valve 127 caused to be in the ON state by the control signal E1 and the pressure difference between the air pressures P1 and P2 is larger than the predetermined pressure value $\Delta P$, the diaphragm actuator 124 is opened to the atmosphere and thereby the intake air cutoff valve 121 is opened. On the other hand, when the control pressure pipe 126 is communicated with the pipe 136 through the three-way solenoid valve 127 caused to be in the OFF state by the control signal E1, the negative pressure is applied to the diaphragm actuator 124 and thereby the intake air cutoff valve 121 is closed.

When the control pressure pipe 128 is communicated with the pipe 136 through the three-way solenoid valve 129 caused to be in the OFF stare by the control signal E3, the negative pressure is applied to the diaphragm actuator 119 and thereby the exhaust cutoff valve 111 is closed, so that only the primary turbosupercharger 109 is caused to work. On the other hand, when the control pressure pipe 128 is opened to the atmosphere through the three-way solenoid valve 129 caused to be in the ON state by the control signal E3, the exhaust cutoff valve 111 is opened and thereby the secondary turbosupercharger 110 is caused to work.

The three-way solenoid valve 131 has its input ports, one of which is opened to the atmosphere and the other of which is connected with the negative pressure tank 143. In the case where the engine speed is relatively low, the negative pressure Pn is applied through the three-way solenoid valve 131 caused to be in the ON state by the control signal E2 and the control pressure pipe 130 to the intake air relief valve 123 and whereby the intake air relief valve 123 is kept open for keeping the intake air relief passage 122 open. Then, the three-way solenoid valve 131 is changed to be in the OFF state by the control signal E2 to make the control pressure pipe 130 open to the atmosphere, so that the intake air relief valve 123 is closed for shutting the intake air relief passage 122.

The air pressure P1 is applied through the control pressure pipe 115 extending from the diaphragm actuator 116 to one of input ports of the three-way solenoid valve 133. When the engine speed and the intake air mass flow are equal to or more than respective predetermined values and the air pressure P1 is equal to or higher than a predetermined pressure value, the three-way solenoid valve 133 is caused to be in the ON state by the control signal E4 so as to apply the air pressure P1 to the diaphragm actuator 120 and thereby the diaphragm actuator 120 causes the waste gate valve 117 to be open for making the bypass passage 118 open. The other of input ports of the three-way solenoid valve 133 is opened to the atmosphere and the waste gate valve 117 is closed for shutting the bypass passage 118 when the diaphragm actuator 120 is opened to the atmosphere through the three-way solenoid valve 133 caused to be in the OFF state by the control signal E4.

Figure 7:
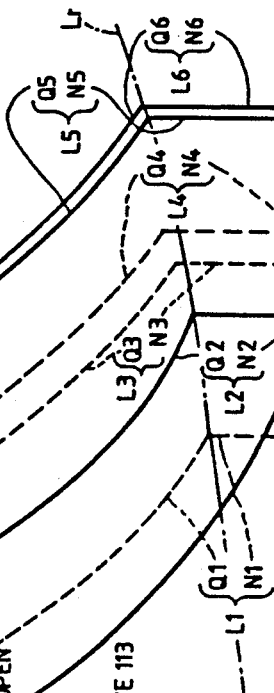
FIGS. 7 and 8 are characteristic charts used for explaining the operation of various valves employed in the embodiment shown in FIG. 5.
Figure 8:
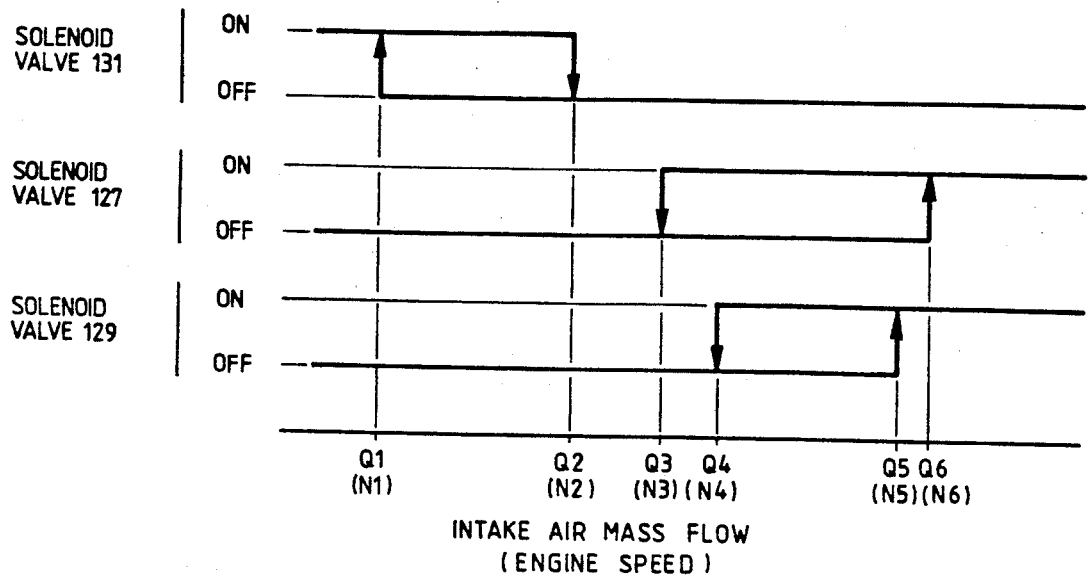

FIG. 7 is a characteristic chart showing the operating conditions of the exhaust bypass valve 113 and the three-way solenoid valves 127, 129, 131 and 133 for controlling the intake air cutoff valve 121, exhaust cutoff valve 111, intake air relief valve 123 and waste gate valve 117, respectively. This characteristic chart of FIG. 7 has an axis of abscissa representing engine speed and an axis of ordinate representing engine load embodied by opening degree of throttle, the maximum value of which is indicated by Dm, and is stored in the form of data map in a memory contained in the control unit 135. Further, FIG. 8 is a characteristic chart showing the operating conditions of the three-way solenoid valves 131, 127 and 129. The characteristic chart of FIG. 8 has an axis of abscissa representing intake air mass flow and engine speed.

According to the characteristic charts of FIGS. 7 and 8, the exhaust snifting valve 113 is changed to be open from closed and to be closed from open in accordance with a line Le in common. On the other hand, the three-way solenoid valve 131 is changed into the ON state from the OFF state for causing the intake air relief valve 123 to be open from closed in accordance with a line L1 which indicates the operating condition of engine in which the engine 101 operates with intake air mass flow Q1 and the operating condition of engine in which the engine 101 operates at engine speed N1 and into the OFF state from the ON state for causing the intake air relief valve 123 to be closed from open in accordance with a line L2 which indicates the operating condition of engine in which the engine 101 operates with intake air mass flow Q2 and the operating condition of engine in which the engine 101 operates at engine speed N2, the three-way solenoid valve 127 is changed into the OFF state from the ON state for causing the intake air cutoff valve 121 to be closed from open in accordance with a line L3 which indicates the operating condition of engine in which the engine 101 operates with intake air mass flow Q3 and the operating condition of engine in which the engine 101 operates at engine speed N3 and into the ON state from the OFF state for causing the intake air cutoff valve 121 to be open from closed in accordance with a line L6 which indicates the operating condition of engine in which the engine 101 operates with intake air mass flow Q6 and the operating condition of engine in which the engine 101 operates at engine speed N6, and each of the three-way solenoid valves 129 and 133 is changed into the OFF state from the ON state for causing each of the exhaust cutoff valve 111 and the waste gate valve 117 to be closed from open in accordance with a line L4 which indicates the operating condition of engine in which the engine 101 operates with intake air mass flow Q4 and the operating condition of engine in which the engine 101 operates at engine speed N4 and into the ON state from the OFF state for causing each of the exhaust cutoff valve 111 and the waste gate valve 117 to be open from closed in accordance with a line L5 which indicates the operating condition of engine in which the engine 101 operates with intake air mass flow Q5 and the operating condition of engine in which the engine 101 operates at engine speed N5.

On the characteristic chart of FIG. 7, an operating area having the line L6 as a lower boundary is set to correspond to the operating condition of the engine 101 in which intake air mass flow fed to the combustion chambers formed in the engine 101 is to be relatively large, and each of an operating area between the lines L5 and L6, an operating area between the lines L2 and L5, and operating area having the line L2 as a upper boundary is set to correspond to the operating condition of the engine 101 in which intake air mass flow fed to the combustion chambers formed in the engine 101 is to be relatively small. Further, a road load line Lr indicates the operating condition of the engine 101 when a vehicle equipped with the engine 101 travels on a level road.

When the operating condition of the engine 101 resides int he operating area having the line L2 as a upper boundary, the control unit 135 is operative to keep each of the three-way solenoid valves 129 and 127 in the OFF state and, contrary, to keep the three-way solenoid valve 131 in the ON state, as shown in FIGS. 7 and 8, so that each of the exhaust cutoff valve 111 and the intake air cutoff valve 121 is kept close and the intake air cutoff valve 123 is kept open. As a result, only the primary turbosupercharger 109 is caused to work for supercharging the engine 101.

Then, when the intake air mass flow in the engine 101 has increased to cross the line L2 and the operating condition of the engine 101 has moved into the operating area between the lines L2 and L5, the control unit 135 is operative to cause the three-way solenoid valve 131 to be in the OFF state, as shown in FIGS. 7 and 8, for closing the intake air relief valve 123. In process of this, before the intake air relief valve 123 is closed, the exhaust bypass valve 113 is opened when the intake air mass flow in the engine 101 has increased to cross the line Le, as shown in FIG. 7, and thereby the exhaust gas is supplied slightly to the turbine Ts of the secondary turbosupercharger 110 though the exhaust bypass passage 114 under a condition in which the intake air relief valve 123 is open. This results in that the turbine Ts is driven to rotate by the exhaust gas flowing through the exhaust bypass passage 114 so that the secondary turbosupercharger 110 is subjected to its preliminary rotation before the exhaust cutoff valve 111 is opened.

After that, when the intake air mass flow in the engine 101 has further increased to cross the line L5 and the operating condition of the engine 101 has moved into the operating area between the lines L5 and L6, the control unit 135 is operative to cause the three-way solenoid valve 129 to be in the ON state, as shown in FIGS. 7 and 8, for opening the exhaust cutoff valve 111, and then, when the intake air mass flow in the engine 101 has still further increased to cross the line L6 and the operating condition of the engine 101 has moved into the operating area having the line L6 as a lower boundary, the control unit 135 is operative to cause the three-way solenoid valve 127 to be in the ON state, as shown in FIGS. 7 and 8, for opening the intake air cutoff valve 121, so that the turbine Tp of the primary turbosupercharger 109 and the turbine Ts of the secondary turbosupercharger 110 are driven to rotate by the exhaust gas passing through the first and second separated exhaust passages 102a and 102b respectively and thereby both the primary and secondary turbosuperchargers 109 and 110 are caused to work for supercharging the engine 101.

As described above, when the engine 101 is accelerated and the operating condition of the engine 101 is changed into the situation wherein the intake air mass flow fed to the engine 101 is to be relatively large from the situation wherein the intake air mass flow fed to the engine 101 is to be relatively small, the exhaust cutoff valve 111 is opened first then the intake air cutoff valve 121 is opened. Accordingly, the secondary turbosupercharger 110 is subjected to its preliminary rotation before the intake air cutoff valve 121 is opened and the supercharging by the secondary turbosupercharger 110 is commenced, so that backward flow of compressed air toward the secondary turbosupercharger 101 in the intake passage 103 is prevented from arising.

Further, when the engine 101 is decelerated and the operating condition of the engine 101 is changed into the situation wherein the intake air mass flow fed to the engine 101 is to be relatively large from the situation wherein the intake air mass flow fed to the engine 101 is to be relatively small, the intake air cutoff valve 121 is kept open until a time point after the exhaust cutoff valve 111 has been closed. Accordingly, although the turbine Cs of the secondary turbosupercharger 110 continues to rotate with the force of inertia for a certain period of time after the exhaust cutoff valve 111, his been closed, air surge in the intake passage 103 is prevented from arising.

In the embodiment shown in FIG. 5, the intake air cutoff valve 121 is controlled to be open substantially by both the three-way solenoid valve 127 and the pressure difference detecting valve 139 and, in practice, the operation of the pressure difference detecting valve 139 results in that the intake air cutoff valve 121 is opened with a certain delay from a time point at which the three-way solenoid valve 127 is caused to be in the ON state by the control signal E1 from the control unit 135. Accordingly, it is possible to arrange the line L6 to be coincide with the line 5 on the characteristic chart of FIG. 7.

Further, in the embodiment shown in FIG. 5 as aforementioned, it is also possible to use a supercharger other than a turbosupercharger in place of the primary turbosupercharger 109.

Figure 9:
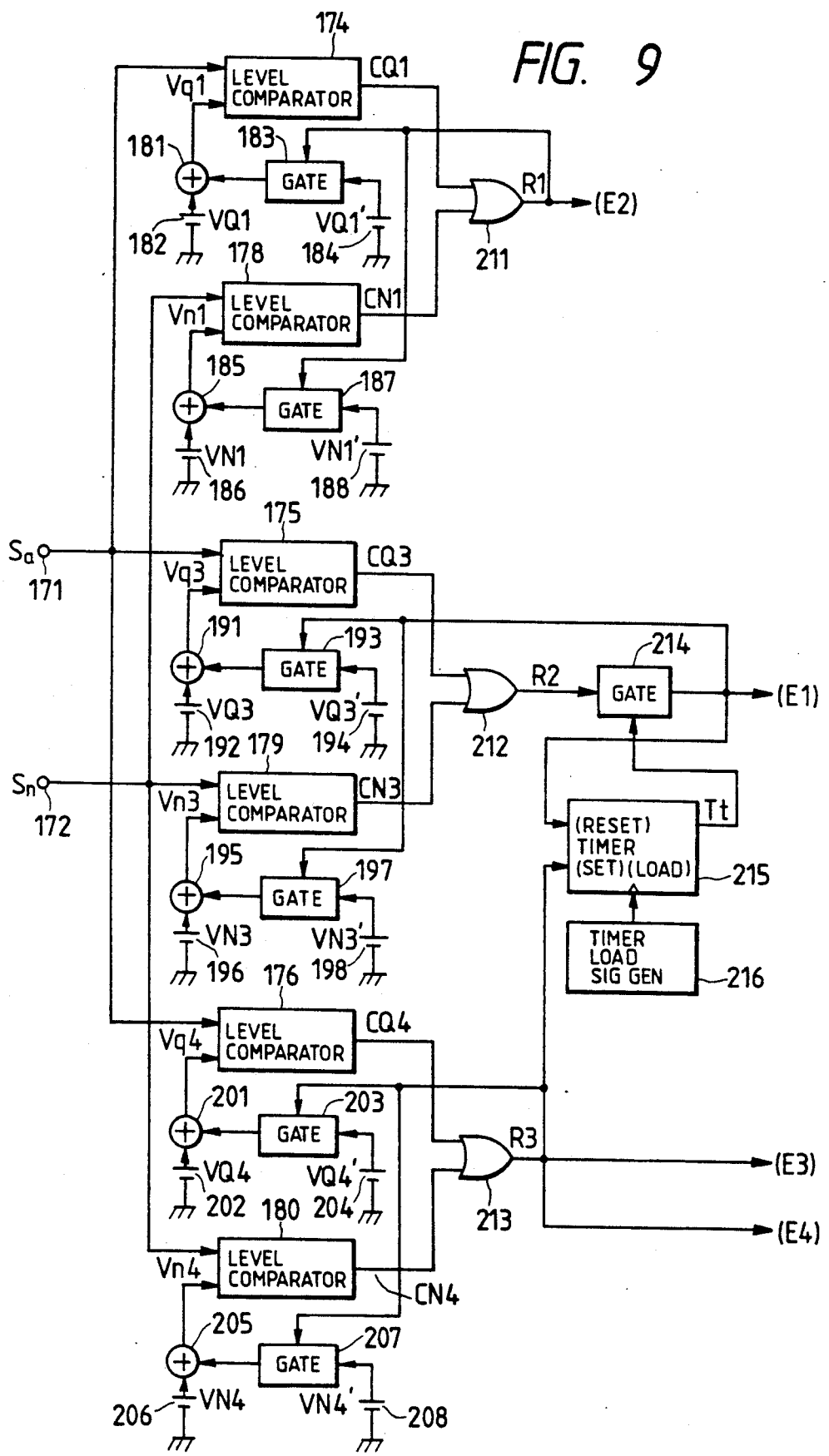
FIG. 9 is a block diagram showing an embodied example of a part of a control unit used in the embodiment shown in FIG. 5.

FIG. 9 shows an example of a circuit constituting a part of the control unit 135 employed in the embodiment shown in FIG. 5, which produces the control signals E1 to E4.

Referring to the FIG. 9, the detection output signal Sa from the air flow sensor 104 is supplied through an input terminal 171 to a level comparator 174 to be compared in level with an output Vq1 of an adder 181 thereat. The level comparator 174 produces a comparison output CQ1 which has a level of "1" when the detection output signal Sa is equal in level to or larger in level than the output Vq1 of the adder 181 and a level of "0" when the detection output signal Sa is lower in level than the output Vq1 of the adder 181.

On the other hand, the detection output signal Sn from the engine speed sensor 161 is supplied through an input terminal 172 to a level comparator 178 to be compared in level with an output Vn1 of an adder 185 thereat. The level comparator 178 produces a comparison output CN1 which has a level of "1" when the detection output signal Sn is equal in level to or larger in level than the output Vn1 of the adder 185 and a level of "0" when the detection output signal Sn is lower in level than the output Vn1 of the adder 185.

The comparison outputs CQ1 and CN1 are supplied to an OR gate 211 and the OR gate 211 produces an output signal R1 which has a high level when at least one of the comparison outputs CQ1 and CN1 has the level of "1" and a low level when each of the comparison outputs CQ1 and CN1 has the level of "0"The output signal R1 of the OR gate 211 is applied to each of gates 183 and 187 so that each of the gates 183 and 187 is put in the ON state when the output signal R1 of the OR gate 211 has the high level.

Accordingly, the output Vq1 of the adder 181 is composed of a reference voltage VQ1, which is obtained from a reference voltage source 182 to correspond to the intake air mass flow Q1, when the output signal R1 of the OR gate 211 has the low level and composed of the reference voltage VQ1 and a reference voltage VQ1', which is obtained from a reference voltage source 184 to correspond to the difference between the intake air mass flows Q1 and Q2, added to each other when the output signal R1 has the high level. Similarly, the output Vn1 of the adder 185 is composed of a reference voltage VN1, which is obtained from a reference voltage source 186 to correspond to the engine speed N1, when the output signal R1 of the OR gate 211 has the low level and composed of the reference voltage VN1 and a reference voltage VN1', which is obtained from a reference voltage source 188 to correspond to the difference between the engine speeds N1 and N2, added to each other when the output signal R1 has the high level.

With such an arrangement including the level comparators 174 and 178 and the OR gate 211, in the case where the operating condition of the engine 101 is changing in such a manner that each of the intake air mass flow represented by the detection output signal Sa and the engine speed represented by the detection output signal Sn increases, the level of the output signal R1 from the OR gate 211 is changed to be high from low when the operating condition of the engine 101 varies to cross the line L2 on the characteristic chart of FIG. 7, and in the case where the operating condition of the engine 101 is changing in such a manner that each of the intake air mass flow represented by the detection output signal Sa and the engine speed represented by the detection output signal Sn decreases, the output signal R1 of the OR gate 211 is changed to be low from high when the operating condition of the engine 101 varies to cross the line L1 on the characteristic chart of FIG. 7. The output signal R1 of the OR gate 211 thus obtained is used as the control signal E2 for controlling the three-way solenoid valve 131.

The detection output signal Sa is supplied also to the level comparator 175 to be compared in level with an output Vq3 of an adder 191 thereat. The level comparator 175 produces a comparison output CQ3 which has a level of "1" when the detection output signal Sa is equal in level to or larger in level than the output Vq3 of the adder 191 and a level of "0" when the detection output signal Sa is lower in level than the output Vq3 of the adder 191.

On the other hand, the detection output signal Sn is supplied also to a level comparator 179 to be compared in level with an output Vn3 of an adder 195 thereat. The level comparator 179 produces a comparison output CN3 which has a level of "1" when the detection output signal Sn is equal in level to or larger in level than the output Vn3 of the adder 195 and a level of "0" when the detection output signal Sn is lower in level than the output Vn3 of the adder 195.

The comparison outputs CQ3 and CN3 are supplied to an OR gate 212 and the OR gate 212 produces an output signal R2 which has a high level when at least one of the comparison outputs CQ3 and CN3 has the level of "1" and a low level when each of the comparison outputs CQ3 and CN3 has the level of "0". The output signal R2 of the OR gate 12 is applied through a gate 214 to each of gates 193 and 97 so that each of the gates 193 and 197 is put in the ON state when the output signal R2 derived from the gate 214 has the high level.

Accordingly, the output Vq3 of the adder 191 is composed of a reference voltage VQ3, which is obtained from a reference voltage source 192 to correspond to the intake air mass flow Q3, when the output signal R2 derived from the gate 214 has the low level and composed of the reference voltage VQ3 and a reference voltage VQ3', which is obtained from a reference voltage source 194 to correspond to the difference between the intake air mass flows Q3 and Q6, added to each other when the output signal R2 derived from the gate 214 has the high level. Similarly, the output Vn3 of the adder 195 is composed of a reference voltage VN3, which is obtained from a reference voltage source 196 to correspond to the engine speed N3, when the output signal R2 derived from the gate 214 has the low level and composed of the reference voltage VN3 and a reference voltage VN3', which is obtained from a reference voltage source 198 to correspond to the difference between the engine speeds N3 and N6, added to each other when the output signal R2 derived from the gate 214 has the high level.

With such an arrangement including the level comparators 175 and 179 and the OR gate 212, in the case where the operating condition of the engine 101 is changing in such a manner that each of the intake air mass flow represented by the detection output signal Sa and the engine speed represented by the detection output signal Sn increases, the level of the output signal R2 derived from the gate 214 is changed to be high from low when the operating condition of the engine 101 varies to cross the line L6 on the characteristic chart of FIG. 7, and in the case where the operating condition of the engine 101 is changing in such a manner that each of the intake air mass flow represented by the detection output signal Sa and the engine speed represented by the detection output signal Sn decreases, the output signal R2 derived from the gate 214 is changed to be low from high when the operating condition of the engine 101 varies to cross the line L3 on the characteristic chart of FIG. 7. The output signal R2 derived from the OR gate 212 is used as the control signal E1 for controlling the three-way solenoid valve 127.

The detection output signal Sa is further supplied to a level comparator 176 to be compared in level with an output Vq4 of an adder 201 thereat. The level comparator 176 produces a comparison output CQ4 which has a level of "1" when the detection output signal Sa is equal in level to or larger in level than the output Vq4 of the adder 201 and a level of "0" when the detection output signal Sa is lower in level than the output Vq4 of the adder 201.

On the other hand, the detection output signal Sn is further supplied to a level comparator 180 to be compared in level with an output Vn4 of an adder 205 thereat. The level comparator 180 produces a comparison output CN4 which has a level of "1" when the detection output signal Sn is equal in level to or larger in level than the output Vn4 of the adder 205 and a level of "0" when the detection output signal Sn is lower in level than the output Vn4 of the adder 205.

The comparison outputs CQ4 and CN4 are supplied to an OR gate 213 and the OR gate 213 produces an output signal R3 which has a high level when at least one of the comparison outputs CQ4 and CN4 has the level of "1" and a low level when each of the comparison outputs CQ4 and CN4 has the level of "0". The output signal R3 of the OR gate 213 is applied to each of gates 203 and 207 so that each of the gates 203 and 207 is put in the ON state when the output signal R3 of the OR gate 213 has the high level.

Accordingly, the output Vq4 of the adder 201 is composed of a reference voltage VQ4, which is obtained from a reference voltage source 202 to correspond to the intake air mass flow Q4, when the output signal R3 of the OR gate 213 has the low level and composed of the reference voltage VQ4 and a reference voltage VQ4', which is obtained from a reference voltage source 204 to correspond to the difference between the intake air mass flows Q4 and Q5, added to each other when the output signal R3 has the high level. Similarly, the output Vn4 of the adder 205 is composed of a reference voltage VN4, which is obtained from a reference voltage source 206 to correspond to the engine speed N4, when the output signal R3 of the OR gate 213 has the low level and composed of the reference voltage VN4 and a reference voltage VN4′, which is obtained from a reference voltage source 208 to correspond to the difference between the engine speeds N4 and N5, added to each other when the output signal R3 has the high level.

With such an arrangement including the level comparators 176 and 180 and the OR gate 213, in the case where the operating condition of the engine 101 is changing in such a manner that each of the intake air mass flow represented by the detection output signal Sa and the engine speed represented by the detection output signal Sn increases, the level of the output signal R3 obtained from the OR gate 213 is changed to be high from low when the operating condition of the engine 101 varies to cross the line L5 on the characteristic chart of FIG. 7, and in the case where the operating condition of the engine 101 is changing in such a manner that each of the intake air mass flow represented by the detection output signal Sa and the engine speed represented by the detection output signal Sn decreases, the output signal R3 of the OR gate 213 is changed to be low from high when the operating condition of the engine 101 varies to cross the line L4 on the characteristic chart of FIG. 7. The output signal R3 of the OR gate 213 thus obtained is as the control signals E3 and E4 for controlling the three-way solenoid valves 129 and 133, respectively.

The output signal R3 of the OR gate 213 is further supplied to a timer 215 as a setting signal or starting signal and the output signal R2 derived from the gate 214 is supplied to the timer 215 as a resetting signal. The timer 215 is supplied further with a load signal from a timer load signal generator 216. The load signal is selected to correspond to, for example, two seconds and loaded on the timer 215 when the timer is set.

The timer 215 is set to start measuring time when the output signal R3 is changed in level to be low from high and then operative to cease its measuring operation automatically to produce a timer output signal Tt having a high level when a predetermined period of time set in accordance with the load signal loaded thereon, for example, the period of two seconds has been measured. Further, the timer 215 is reset to produce the timer output signal Tt having a low level when the output signal R2 derived from the gate 214 is changed in level to be low from high. The timer output signal Tt is supplied to the gate 214 connected to the OR gate 212 and the gate 214 is turned to be in the OFF state from the ON state when the timer output signal Tt is changed in level to be high from low.

The output signal R2 is derived from the gate 214 without any change in its level when the gate 214 is in the ON state and modified to have the low level when the gate 214 is in the OFF state.

With such an arrangement containing the gate 214 and timer 215, when the operating condition of the engine 101 is changing in such a manner that each of the intake air mass flow represented by the detection output signal Sa and the engine speed represented by the detection output signal Sn decreases, the control signal E1 having the level for causing the three-way solenoid valve 127 to be in the OFF state is surely produced within a period of time equal to or shorter than the predetermined period of time set in accordance with the load signal, for example, the period of two second, since the control signal E3 having the level for causing the three-way solenoid valve 129 to be in the OFF state.

Figure 10:
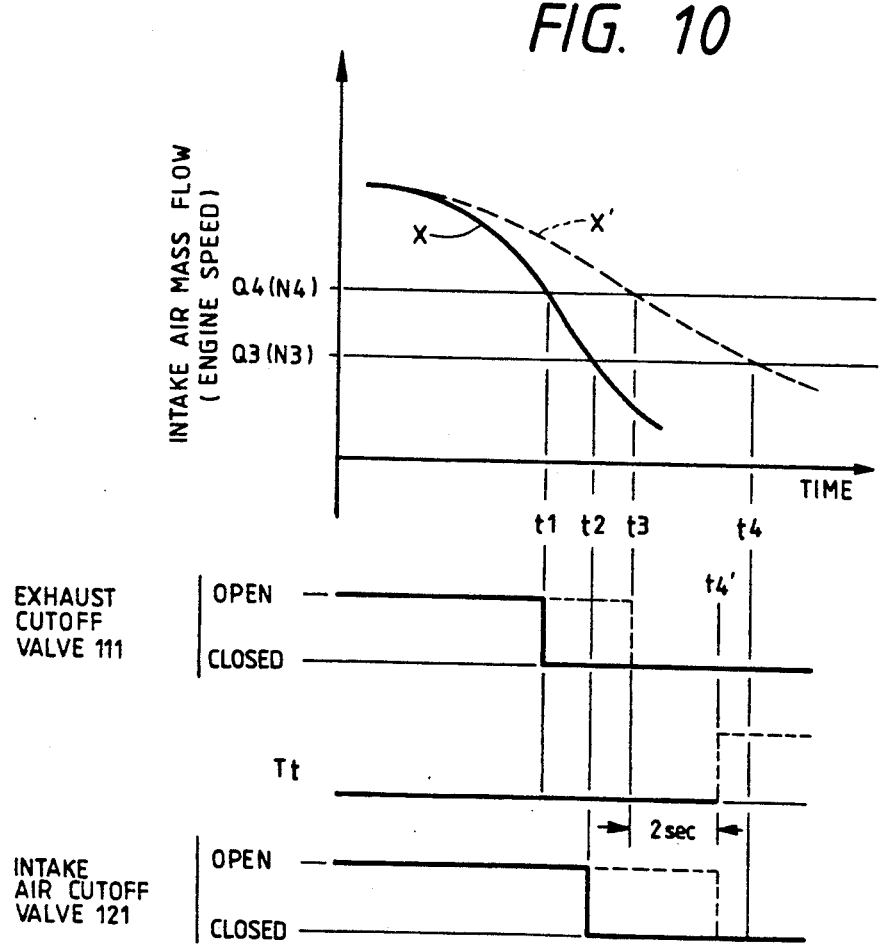
FIG. 10 shows a time chart used for explaining the operation of the embodiment shown in FIG. 5.

By way of example, in the case where the intake air mass flow represented by the detection output signal Sa or the engine speed represented by the detection output signal Sn decreases rather rapidly as shown with a solid line X in FIG. 10, the exhaust cutoff valve 111 is caused to be closed from open by the three-way solenoid valve 129 to which the control signal E3 is supplied at a time point t1 at which the intake air mass flow decreases to be smaller than Q4 or the engine speed decreases to be lower then N4, and then the intake air cutoff valve 121 is caused to be closed from open by the three-way solenoid valve 127 to which the control signal E1 is supplied at a time point t2 which is delayed by less than two seconds compared with the time point t1 and at which the intake air mass flow decreases to be smaller than Q3 or the engine speed decreases to be lower then N3. In such a case, the output signal R2 derived from the gate 214 is changed in level to be low from high before the gate 214 is turned off by the timer output signal Tt.

On the other hand, in the case where the intake air mass flow represented by the detection output signal Sa or the engine speed represented by the detection output signal Sn decreases gradually as shown with a broken line X′ in FIG. 10, the exhaust cutoff valve 111 is caused to be closed from open by the three-way solenoid valve 129 to which the control signal E3 is supplied at a time point t3 at which the intake air mass flow decreases to be smaller than Q4 or the engine speed decreases to be lower then N4, and then the intake air cutoff valve 121 is caused to be close from open by the three-way solenoid valve 127 to which the control signal E1 is supplied at a time point t4′ which is delayed by two seconds compared with the time point t3 though the intake air mass flow decreases to be smaller than Q3 or the engine speed decreases to be lower then N3 at a time point t4 which is delayed by more than two seconds compared with the time point t3. In such a case, the output signal R2 derived from the gate 214 is changed in level to be low from high by the gate 214 turned off by the timer output signal Tt which is changed in level to be high from low at the time point t4′. This results in an advantage that backward flow of compressed air toward the secondary turbosupercharger 110 is prevented from arising when the rotation speed of the turbine Ts of the secondary turbosupercharger 110 reduces gradually.

What is claimed is:

1. An air supply control system for an internal combustion engine comprising:
   a plurality of separated exhaust passages connected with the engine,
   a plurality of separated intake passages connected with the engine,
   a plurality of superchargers including at least a first supercharger and a second supercharger constituted as a turbosupercharger having a turbine disposed in one of the separated exhaust passages and a blower connected through a shaft with the turbine and disposed in one of the separated intake passages,
   an exhaust cutoff valve operative selectively to be open and closed respectively for opening and closing the separated exhaust passage in which the turbine of said second supercharger is disposed,
   an intake air cutoff valve operative selectively to be open and closed respectively for opening and closing the separated intake passage in which the blower of said second supercharger is disposed, first actuating means for driving said exhaust cutoff valve to be open and closed selectively, second actuating means for driving said intake air cutoff valve to be open and closed selectively, engine operation detecting means for detecting operating conditions of the engine to produce a first detection output, actuator control means for controlling, in response to the first detection output form said engine operation detecting means, said first and second actuating means to close both said exhaust cutoff valve and said intake air cutoff valve so that said second supercharger is restrained from supercharging the engine when the first detection output shows a situation that intake air mass flow fed to the engine is relatively small and to open both said exhaust cutoff valve and said intake air cutoff valve so that both of said first and second superchargers work for supercharging the engine when the first detection output shows a situation that the intake air mass flow fed to the engine is relatively large, engine operation change detecting means for detecting, based on the first detection output from said engine operation detecting means, changes in operating condition of the engine between a situation wherein the intake air mass flow fed to the engine is relatively small and a situation wherein the intake air mass flow fed to the engine is relatively large and producing a second detection output, and valve operation setting means for controlling, in response to the second detection output from said engine operation change detecting means, said actuator control means so that the intake air cutoff valve opening point in time is delayed compared with the exhaust cutoff valve opening point in time when the second detection output shows that the operating condition of the engine is changed into the situation wherein the intake air mass flow fed to the engine is relatively large from the situation wherein the intake air mass flow fed to the engine is relatively small and said intake air cutoff valve closing point in time is delayed compared with said exhaust cutoff valve closing point in time when the second detection output shows the operating condition of the engine is changed into the situation wherein the intake air mass flow fed to the engine is relatively small from the situation wherein the intake air mass flow fed to the engine is relatively large, wherein:

said actuator control means is operative to detect, based on the first detection output from said engine operation detecting means, one of predetermined operating areas provided on an operating characteristic map defined by coordinates of operating parameters of the engine in which an actual operating condition of the engine resides and to control said first and second actuating means in accordance with the detected operation area, and said operating characteristic map contains a first predetermined operating area used for controlling said intake air cutoff valve to be open from closed and a second predetermined operating area used for controlling said exhaust cutoff valve to be open from closed, said first predetermined operating area having larger intake air mass flow compared with said second predetermined operating area.

2. An air supply control system according to claim 1, wherein each of said first and second actuating means comprises a pressure responsive actuator operative to work with intake pressure in the engine, a pressure passage for applying the intake pressure to said pressure responsive actuator, and a control valve disposed in said pressure passage for controlling the intake pressure applied to said pressure responsive actuator.

3. An air supply control system according to claim 1, wherein said actuator control means is operative to control said first and second actuating means in such a manner that said intake air cutoff valve is closed after a predetermined period of time has elapsed since said exhaust cutoff valve has been controlled to be closed from open.

4. An air supply control system according to claim 1, wherein said intake air cutoff valve comprises a butterfly valve.

5. An air supply control system for an internal combustion engine comprising:

a plurality of separated exhaust passages connected wit the engine, a plurality of separated intake passages connected with the engine, a plurality of superchargers including at least a first supercharger and a second supercharger constituted as a turbosupercharger having a turbine disposed in one of the separated exhaust passages and a blower connected through a shaft with the turbine and disposed in one of the separated intake passages, an exhaust cutoff valve operative selectively to be open and closed respectively for opening and closing the separated exhaust passage in which the turbine of said second supercharger is disposed, an intake air cutoff valve operative selectively to be open and closed respectively for opening and closing the separated intake passage in which the blower of said second supercharger is disposed, first actuating means for driving said exhaust cutoff valve to be open and closed selectively, second actuating means for driving said intake air cutoff valve to be open and closed selectively, engine operation detecting means for detecting operating conditions of the engine to produce a first detection output, actuator control means for controlling, in response to the first detection output from said engine operation detecting means, said first and second actuating means to close both said exhaust cutoff valve and said intake air cutoff valve so that said second supercharger is restrained from supercharging the engine when the first detection output shows a situation that intake air mass flow fed to the engine is relatively small and to open both said exhaust cutoff valve and said intake air cutoff valve so that both of said first and second superchargers work for supercharging the engine when the first detection output shows a situation that the intake air mass flow fed to the engine is relatively large, engine operation change detecting means for detecting, based on the first detection output from said engine operation detecting means, changes in operating condition of the engine between a situation wherein the intake air mass flow fed to the engine is relatively small and a situation wherein the intake air mass flow fed to the engine is relatively large and producing a second detection output, and valve operation setting means for controlling, in response to the second detection output from said engine operation change detecting means, said actuator control means so that the intake air cutoff valve opening point in time is delayed compared with the exhaust cutoff valve opening point in time when the second detection output shows that the operating condition of the engine is changed into the situation wherein the intake air mass flow fed to the engine is relatively large from the situation wherein the intake air mass flow fed to the engine is relatively small and said intake air cutoff valve closing point in time is delayed compared with said exhaust cutoff valve closing point in time when the second detection output shows the operating condition of the engine is changed into the situation wherein the intake air mass flow fed to the engine is relatively small from the situation wherein the intake air mass flow fed to the engine is relatively large, wherein:

said actuator control means is operative to detect, based on the first detection output from said engine operation detecting means, one of predetermined operating areas provided on an operating characteristic map defined by coordinates of operating parameters of the engine in which an actual operating condition of the engine resides and to control said first and second actuating means in accordance with the detected operation area, and said operating characteristic chart contains a first predetermined operating area used for controlling said intake air cutoff valve to be closed from open and a second predetermined operating area used for controlling said exhaust cutoff valve to be closed form open, said first predetermined operating area having smaller intake air mass flow compared with said second predetermined operating area.

6. An air supply control system according to claim 5, wherein said actuator control means is operative to control said first and second actuating means in such a manner that said intake air cutoff valve is forcibly closed after a predetermined period of time has elapsed since said exhaust cutoff valve has been controlled to be closed from open.

7. An air supply control system for an internal combustion engine comprising:

a plurality of separated exhaust passages connected with the engine, a plurality of separated intake passages connected with the engine, a plurality of superchargers including at least a first supercharger and a second supercharger constituted as a turbosupercharger having a turbine disposed in one of the separated exhaust passages and a blower connected through a shaft with the turbine and disposed in one of the separated intake passages, an exhaust cutoff valve operative selectively to be open and closed respectively for opening and closing the separated exhaust passage in which the turbine of said second supercharger is disposed, an intake air cutoff valve operative selectively to be open and closed respectively for opening and closing the separated intake passage in which the blower of said second supercharger is disposed, first actuating means for driving said exhaust cutoff valve to be open and closed selectively, second actuating means for driving said intake air cutoff valve to be open and closed selectively, engine operation detecting means for detecting operating conditions of the engine to produce a first detection output, actuator control means for controlling, in response to the first detection output from said engine operation detecting means, said first and second actuating means to close both said exhaust cutoff valve and said intake air cutoff valve so that said second supercharger is restrained from supercharging the engine when the first detection output shows a situation that intake air mass flow fed to the engine is relatively small and to open both said exhaust cutoff valve and said intake air cutoff valve so that both of said first and second superchargers work for supercharging the engine when the first detection output shows a situation that the intake air mass flow fed to the engine is relatively large, engine operation change detecting means for detecting, based on the first detection output from said engine operation detecting means, changes in operating condition of the engine between a situation wherein the intake air mass flow fed to the engine is relatively small and a situation wherein the intake air mass flow fed to the engine is relatively large and producing a second detection output, and valve operation setting means for controlling, in response to the second detection output from said engine operation change detecting means, said actuator control means so that the intake air cutoff valve opening point in time is delayed compared with the exhaust cutoff valve opening point in time when the second detection output shows that the operating condition of the engine is changed into the situation wherein the intake air mass flow fed to the engine is relatively large from the situation wherein the intake air mass flow fed to the engine is relatively small and said intake air cutoff valve closing point in time is delayed compared with said exhaust cutoff valve closing point in time when the second detection output shows the operating condition of the engine is changed into the situation wherein the intake air mass flow fed to the engine is relatively small from the situation wherein the intake air mass flow fed to the engine is relatively large, said actuator control means including pressure difference detecting means for detecting a pressure difference between air pressure at a portion downstream of said intake air cutoff valve in the separate intake passage and air pressure at a portion upstream of said intake air cutoff valve in the separate intake passage, and being operative to control said second actuating means so as to open said intake air cutoff valve when the pressure difference detected by said pressure difference detecting means is not larger than a predetermined pressure valve.

8. An air supply control system for an internal combustion engine comprising:

a plurality of separated exhaust passages connected with the engine, a plurality of separated intake passages connected with the engine, a plurality of superchargers including at least a first supercharger and a second supercharger constituted as a turbosupercharger having a turbine disposed in one of the separated exhaust passages and a blower connected through a shaft with the turbine and disposed in one of the separated intake passages, an exhaust cutoff valve operative selectively to be open and closed respectively for opening and closing the separated exhaust passage in which the turbine of said second supercharger is disposed, an intake air cutoff valve operative selectively to be open and closed respectively for opening and closing the separated intake passage in which the blower of said second supercharger is disposed, first actuating means for driving said exhaust cutoff valve to be open and closed selectively, second actuating means for driving said intake air cutoff valve to be open and closed selectively, engine operation detecting means for detecting operating conditions of the engine to produce a first detection output, actuator control means for controlling, in response to the first detection output from said engine operation detecting means, said first and second actuating means to close both said exhaust cutoff valve and said intake air cutoff valve so that said second supercharger is restrained from supercharging the engine when the first detection output shows a situation that intake air mass flow fed to the engine is relatively small and to open both said exhaust cutoff valve and said intake air cutoff valve so that both of said first and second superchargers work for supercharging the engine when the first detection output shows a situation that the intake air mass flow fed to the engine is relatively large, engine operation change detecting means for detecting, based on the first detection output from said engine operation detecting means, changes in operating condition of the engine between a situation wherein the intake air mass flow fed to the engine is relatively small and a situation wherein the intake air mass flow fed to the engine is relatively large and producing a second detection output, and valve operation setting means for controlling, in response to the second detection output from said engine operation change detecting means, said actuator control means so that the intake air cutoff valve opening point in time is delayed compared with the exhaust cutoff valve opening point in time when the second detection output shows that the operating condition of the engine is changed into the situation wherein the intake air mass flow fed to the engine is relatively large from the situation wherein the intake air mass flow fed to the engine is relatively small and said intake air cutoff valve closing point in time is delayed compared with said exhaust cutoff valve closing point in time when the second detection output shows the operating condition of the engine is changed into the situation wherein the intake air mass flow fed to the engine is relatively small from the situation wherein the intake air mass flow fed to the engine is relatively large, wherein:

each of said first and second actuating means comprises a pressure responsive actuator operative to work with intake pressure in the engine, a pressure passage for applying the intake pressure to said pressure responsive actuator, and a control valve disposed on said pressure passage for controlling the intake pressure applied to said pressure responsive actuator, and said pressure passage is provided for applying selectively negative intake pressure obtained at a portion downstream to a throttle valve in an intake passage coupled with the separated intake passages and the atmospheric pressure to said pressure responsive actuator, and said negative intake pressure and atmospheric pressure are applied to said pressure responsive actuator in the second actuating means so as to close and open said intake air cutoff valve, respectively.

9. An air supply control system according to claim 8, wherein said actuator control means includes pressure difference detecting means for detecting a pressure difference between air pressure at a portion downstream to said intake air cutoff valve in the separate intake passage and air pressure at a portion upstream to said intake air cutoff valve in the separate intake passage, and is operative to control said second actuating means so as to open said intake air cutoff valve when the pressure difference detected by said pressure difference detecting means into larger than a predetermined pressure valve.

10. An air supply control system for an internal combustion engine comprising:

a plurality of separated exhaust passages connected with the engine, a plurality of separated intake passages connected with the engine, a plurality of superchargers including at least a first supercharger and a second supercharger constituted as a turbosupercharger having a turbine disposed in one of the separated exhaust passages and a blower connected through a shaft with the turbine and disposed in one of the separated intake passages, an exhaust cutoff valve operative selectively to be open and closed respectively for opening and closing the separated exhaust passage in which the turbine of said second supercharger is disposed, an intake air cutoff valve operative selectively to be open and closed respectively for opening and closing the separated intake passage in which the blower of said second supercharger is disposed, first actuating means for driving said exhaust cutoff valve to be open and closed selectively, second actuating means for driving said intake air cutoff valve to be open and closed selectively, engine operation detecting means for detecting operating conditions of the engine to produce a first detection output, actuator control means for controlling, in response to the first detection output from said engine operation detecting means, said first and second actuating means to close both said exhaust cutoff valve and said intake air cutoff valve so that said second supercharger is restrained from supercharging the engine when the first detection output shows a situation that intake air mass flow fed to the engine is relatively small and to open both said exhaust cutoff valve and said intake air cutoff valve so that both of said first and second superchargers work for supercharging the engine when the first detection output shows a situation that the intake air mass flow fed to the engine is relatively large, engine operation change detecting means for detecting, based on the first detection output from said engine operation detecting means, changes in operating condition of the engine between a situation wherein the intake air mass flow fed to the engine is relatively small and a situation wherein the intake air mass flow fed to the engine is relatively large and producing a second detection output, and valve operation setting means for controlling, in response to the second detection output from said engine operation change detecting means, said actuator control means so that the intake air cutoff valve opening point in time is delayed compared with the exhaust cutoff valve opening point in time when the second detection output shows that the operating condition of the engine is changed into the situation wherein the intake air mass flow fed to the engine is relatively large from the situation wherein the intake air mass flow fed to the engine is relatively small and said intake air cutoff valve closing point in time is delayed compared with said exhaust cutoff valve closing point in time when the second detection output shows the operating condition of the engine is changed into the situation wherein the intake air mass flow fed to the engine is relatively small from the situation wherein the intake air mass flow fed to the engine is relatively large, wherein:

said actuator control means is operative to detect, based on the first detection output from said engine operation detecting means, one of predetermined operating areas provided on an operating characteristic map defined by coordinates of operating parameters of the engine in which an actual operating condition of the engine resides and to control said first and second actuating means in accordance with the detected operation area, and said actuator control means is operative to control said first and second actuating means in such a manner that said intake air cutoff valve is caused to be open from closed in response to a first operating condition of the engine and to be closed from open in response to a second operating condition of the engine different from said first operating condition, said exhaust cutoff valve is caused to be open from closed in response to a third operating condition of the engine and to be closed from open in response to a fourth operating condition of the engine different from said third operating condition, and an area of operating conditions of the engine between said third and fourth operating conditions is included in an area of operating conditions of the engine between said first and second operating conditions.

11. An air supply control system for an internal combustion engine comprising:

a plurality of separated exhaust passages connected with the engine, a plurality of separated intake passages connected with the engine, a plurality of superchargers including at least a first supercharger and a second supercharger constituted as a turbosupercharger having a turbine disposed in one of the separated exhaust passages and a blower connected through a shaft with the turbine and disposed in one of the separated intake passages, an exhaust cutoff valve operative selectively to be open and closed respectively for opening and closing the separated exhaust passage in which the turbine of said second supercharger is disposed, an intake air cutoff valve operative selectively to be open and closed respectively for opening and closing the separated intake passage in which the blower of said second supercharger is disposed, first actuating means for driving said exhaust cutoff valve to be open and closed selectively, second actuating means for driving said intake air cutoff valve to be open and closed selectively, engine operation detecting means for detecting operating conditions of the engine to produce a first detection output, actuator control means for controlling, in response to the first detection output from said engine operation detecting means, said first and second actuating means to close both said exhaust cutoff valve and said intake air cutoff valve so that said second supercharger is restrained from supercharging the engine when the first detection output shows a situation that intake air mass flow fed to the engine is relatively small and to open both said exhaust cutoff valve and said intake air cutoff valve so that both of said first and second superchargers work for supercharging the engine when the first detection output shows a situation that the intake air mass flow fed to the engine is relatively large, engine operation change detecting means for detecting, based on the first detection output from said engine operation detecting means, changes in operating condition of the engine between a situation wherein the intake air mass flow fed to the engine is relatively small and a situation wherein the intake air mass flow fed to the engine is relatively large and producing a second detection output, and valve operation setting means for controlling, in response to the second detection output from said engine operation change detecting means, said actuator control means so that the intake air cutoff valve opening point in time is delayed compared with the exhaust cutoff valve opening point in time when the second detection output shows that the operating condition of the engine is changed into the situation wherein the intake air mass flow fed to the engine is relatively large from the situation wherein the intake air mass flow fed to the engine is relatively small and said intake air cutoff valve closing point in time is delayed compared with said exhaust cutoff valve closing point in time when the second detection output shows the operating condition of the engine is changed into the situation wherein the intake air mass flow fed to the engine is relatively small from the situation wherein the intake air mass flow fed to the engine is relatively large, and an intake air relief passage provided to the separated intake passage in which the blower of said second supercharger is disposed for detouring the blower of said second supercharger and an intake air relief valve is provided in said intake air relief passage for opening said intake air relief passage when the intake air mass flow fed to the engine is relatively small and closing said intake air relief passages when the intake air mass flow fed to the engine is relatively large.

12. An air supply control system according to claim 11, wherein said intake air relief valve is controlled to be open from closed at a time point later than another time point at which said exhaust cutoff valve is controlled to be closed from open.

13. An air supply control system according to claim 12, wherein said intake air relief valve and said exhaust cutoff valve are controlled respectively when an actual operating condition of the engine resides in respective different ones of predetermined operating areas provided on an operating characteristic map of the engine.

14. An air supply control system according to claim 12, wherein said intake air relief valve is controlled to be open from closed at a time point later than another time point at which said intake air cutoff valve is controlled to be closed from open.

15. An air supply control system according to claim 14, wherein said intake air relief valve and said intake air cutoff valve are controlled respectively when an actual operating condition of the engine resides in respective different ones of predetermined operating areas provided on an operating characteristic map of the engine.

16. An air supply control system according to claim 11, wherein said intake air relief valve is controlled to be open from closed at a first time point later than each of a second time point at which said exhaust cutoff valve is controlled to be closed from open and a third time point at which said intake air cutoff valve is controlled to be closed from open.

17. An air supply control system according to claim 16, wherein said intake air relief valve, said exhaust cutoff valve and said intake air cutoff valve are controlled respectively when an actual operating condition of the engine resides in respective different ones of predetermined operating areas provided on an operating characteristic MAP of the engine.

18. An air supply control system for an internal combustion engine comprising:
a plurality of separated exhaust passages connected with the engine,
a plurality of separated intake passages connected with the engine,
a plurality of superchargers including at least a first supercharger and a second supercharger constituted as a turbosupercharger having a turbine disposed in one of the separated exhaust passages and a blower connected through a shaft with the turbine and disposed in one of the separated intake passages,
an exhaust cutoff valve operative selectively to be open and closed respectively for opening and closing the separated exhaust passage in which the turbine of said second supercharger is disposed,
an intake air cutoff valve operative selectively to be open and closed respectively for opening and closing the separated intake passage in which the blower of said second supercharger is disposed,
first actuating means for driving said exhaust cutoff valve to be open and closed selectively,
second actuating means for driving said intake air cutoff valve to be open and closed selectively,
engine operation detecting means for detecting operating conditions of the engine to produce a first detection output,
actuator control means for controlling, in response to the first detection output from said engine operation detecting means, said first and second actuating means to close both said exhaust cutoff valve and said intake air cutoff valve so that said second supercharger is restrained from supercharging the engine when the first detection output shows a situation that intake air mass flow fed to the engine is relatively small and to open both said exhaust cutoff valve and said intake air cutoff valve so that both of said first and second superchargers work for supercharging the engine when the first detection output shows a situation that the intake air mass flow fed to the engine is relatively large,
engine operation change detecting means for detecting, based on the first detection output from said engine operation detecting means, changes in operating condition of the engine between a situation wherein the intake air mass flow fed to the engine is relatively small and a situation wherein the intake air mass flow fed to the engine is relatively large and producing a second detection output, and
valve operation setting means for controlling, in response to the second detection output from said engine operation change detecting means, said actuator control means so that the intake air cutoff valve opening point in time is delayed compared with the exhaust cutoff valve opening point in time when the second detection output shows that the operating condition of the engine is changed into the situation wherein the intake air mass flow fed to the engine is relatively large from the situation wherein the intake air mass flow fed to the engine is relatively small and said intake air cutoff valve closing point in time is delayed compared with said exhaust cutoff valve closing point in time when the second detection output shows the operating condition of the engine is changed into the situation wherein the intake air mass flow fed to the engine is relatively small from the situation wherein the intake air mass flow fed to the engine is relatively large, wherein:
said actuator control means is operative to detect, based on the first detection output from said engine operation detecting means, one of predetermined operating areas provided on an operating characteristic map defined by coordinates of operating parameters of the engine in which an actual operating condition of the engine resides and to control said first and second actuating means in accordance with the detected operation area, and
said operating characteristic map shows the operating areas on a coordinate plane defined by coordinate axes representing respectively engine speed and engine load.

19. An air supply control system according to claim 18, wherein said engine load defining the coordinate plane shown by the operating characteristic map is embodied by the intake air mass flow fed to the engine.

20. An air supply control system for an internal combustion engine comprising:
a plurality of separated exhaust passages connected with the engine,
a plurality of separated intake passages connected with the engine,
a plurality of superchargers including at least a first supercharger and a second supercharger constituted as a turbosupercharger having a turbine disposed in one of the separated exhaust passages and a blower connected through a shaft with the turbine and disposed in one of the separated intake passages, an exhaust cutoff valve operative selectively to be open and closed respectively for opening and closing the separated exhaust passage in which the turbine of said second supercharger is disposed, an intake air cutoff valve operative selectively to be open and closed respectively for opening and closing the separated intake passage in which the blower of said second supercharger is disposed, first actuating means for driving said exhaust cutoff valve to be open and closed selectively, second actuating means for driving said intake air cutoff valve to be open and closed selectively, engine operation detecting means for detecting operating conditions of the engine to produce a first detection output, actuator control means for controlling, in response to the first detection output from said engine operation detecting means, said first and second actuating means to close both said exhaust cutoff valve and said intake air cutoff valve so that said second supercharger is restrained from supercharging the engine when the first detection output shows a situation that intake air mass flow fed to the engine is relatively small and to open both said exhaust cutoff valve and said intake air cutoff valve so that both of said first and second superchargers work for supercharging the engine when the first detection output shows a situation that the intake air mass flow fed to the engine is relatively large, engine operation change detecting means for detecting, based on the first detection output from said engine operation detecting means, changes in operating condition of the engine between a situation wherein the intake air mass flow fed to the engine is relatively small and a situation wherein the intake air mass flow fed to the engine is relatively large and producing a second detection output, and valve operation setting means for controlling, in response to the second detection output from said engine operation change detecting means, said actuator control means so that the intake air cutoff valve opening completion point in time is delayed compared with the exhaust cutoff valve opening completion point in time when the second detection output shows that the operating condition of the engine is changed into the situation wherein the intake air mass flow fed to the engine is relatively large from the situation wherein the intake air mass flow fed to the engine is relatively small and said intake air cutoff valve closing completion point in time is delayed compared with said exhaust cutoff valve closing completion point in time when the second detection output shows the operating condition of the engine is changed into the situation wherein the intake air mass flow fed to the engine is relatively small from the situation wherein the intake air mass flow fed to the engine is relatively large.

* * * * *